US012724004B1

(12) United States Patent
Marzouk et al.

(10) Patent No.: US 12,724,004 B1
(45) Date of Patent: Sep. 1, 2026

(54) CONFIGURABLE ELECTROCHEMICAL CELL

(71) Applicant: United Arab Emirates University, Al Ain (AE)

(72) Inventors: Sayed Marzouk, Al Ain (AE); Issa Waswas, Al Ain (AE); Dina Ashraf, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 19/561,828

(22) Filed: Mar. 10, 2026

(51) Int. Cl.
*G01N 27/413* (2006.01)
*G01N 27/28* (2006.01)

(52) U.S. Cl.
CPC ......... *G01N 27/413* (2013.01); *G01N 27/283* (2013.01)

(58) Field of Classification Search
None
See application file for complete search history.

(56) References Cited

U.S. PATENT DOCUMENTS 10,234,419 B2 3/2019 Sun et al.
12,210,007 B2 1/2025 Salzer et al.
2024/0241033 A1 7/2024 Carr et al.

FOREIGN PATENT DOCUMENTS

CN 118348095 A 7/2024
WO 1992018857 A1 10/1992

OTHER PUBLICATIONS

S.A.M. Marzouk, et al., “Development and Characterization of Novel Flow Injection, Thin-Layer, and Batch Cells for Electroanalytical Applications Using Screen-Printed Electrodes”, Analytical Chemistry, 93(49): p. 16690-16699, Dec. 2021.*
Wang et al., “Flow Electrolysis at a Porous Tubular Electrode with Internal Stirring”, Analytica Chimica Acta, 1983, vol. 151, pp. 109-116.
Jung et al., “Gastight Hydrodynamic Electrochemistry: Design for a Hermetically Sealed Rotating Disk Electrode Cell”, Analytical Chemistry, Dec. 17, 2016, vol. 89, Issue 1, pp. 581-585 (just accepted manuscript, 10 pages).

* cited by examiner

*Primary Examiner* — J. Christopher Ball
(74) *Attorney, Agent, or Firm* — MH2 Technology Law Group LLP

(57) ABSTRACT

The electrochemical cell includes a cell base configured to support both a screen-printed electrode chip and a solid disc electrode, a cell body disposed on the cell base and defining a sample chamber, a cell cover disposed on the cell body, and a rotating rod extending through the cell cover into the sample chamber. The cell body is attachable to the cell base in a first orientation to align with the screen-printed electrode chip and in a second orientation to align with the solid disc electrode. Embodiments enable a universal batch cell, functionality that is equivalent to a rotating disc electrode, and dual functionality as both a batch cell and a flow cell.

21 Claims, 14 Drawing Sheets

CONFIGURABLE ELECTROCHEMICAL CELL

FIELD

The present disclosure relates to electrochemical analysis cells, and more particularly but not exclusively to configurable electrochemical cells compatible with screen-printed electrodes and metallic electrodes for electroanalytical applications.

BACKGROUND

Background description includes information that will be useful in understanding the present invention. It is not an admission that any of the information provided herein is prior art or relevant to the presently claimed invention, or that any publication specifically or implicitly referenced is prior art.

Electrochemical analysis techniques are widely used in various fields including clinical analysis, environmental monitoring, and food safety testing. Screen-printed electrodes (SPEs) have emerged as cost-effective tools for electrochemical analysis due to their miniaturized nature, disposability, and suitability for use with microvolumes of solution. These electrodes are based on the deposition of conductive materials such as carbon, silver, gold, or platinum on substrates including ceramic, plastic, or paper materials.

The rotating disc electrode (RDE) is used in hydrodynamic voltammetric studies due to its ability to provide controlled mass transport at the electrode surface. The theoretical basis established by Levich provides a quantitative relationship between diffusion-limiting current and various parameters including angular velocity, analyte concentration, diffusion coefficient, and solution viscosity. However, RDE experiments typically require sample volumes in the millilitre range, mechanically rotating shafts with slip-ring electrical contacts, and present challenges when screening electrodes made of different conductive materials or surface modifications.

Various hydrodynamic systems have been developed in which the electrode remains stationary while the solution moves, including wall-tube electrodes, wall-jet electrodes, tube electrodes, and channel electrodes. Additionally, approaches involving rotating droplets and sandwiched droplet configurations have been explored to achieve hydrodynamic voltammetry in microliter-scale samples. However, these approaches may suffer from limitations such as rapid solvent evaporation, the need for complex mechanical stages, or reliance on conventional RDE systems to induce rotation.

Cells designed for use with screen-printed electrode chips (SPECs) under hydrodynamic conditions, deoxygenated solutions, temperature-controlled solutions, or flow injection analysis modes have been developed. Some designs utilize wall-jet configurations, and recent developments have employed 3D printing for rapid prototyping. However, challenges remain in achieving convenient stirred-solution experiments with SPECs in planar configurations, controlling atmosphere and temperature during measurements, and versatility.

The present disclosure seeks to overcome one or more of the aforementioned problems. More particularly, but not exclusively, the present disclosure seeks to provide an improved electrochemical cell.

SUMMARY

According to a first aspect of the present disclosure there is provided an electrochemical cell for electrochemical analysis. The electrochemical cell comprises a cell base configured to support both a screen-printed electrode chip and a solid disc electrode, a cell body disposed on the cell base and defining a sample chamber, wherein the cell body is attachable to the cell base in a first orientation to align a neck region with the screen-printed electrode chip and in a second orientation to align the neck region with the solid disc electrode, a cell cover detachably connected to the cell body, a rotating rod extending through the cell cover into the sample chamber.

The rotating rod may be rotatably supported by one or more bearings disposed in the cell cover.

The electrochemical cell may comprise a coupling rod extending from the cell cover. The coupling rod may be configured to connect to an independent overhead mechanical stirrer for rotating the rotating rod.

The configurable orientation of the cell body on the cell base enables users to select between the screen-printed electrode chip and the solid disc electrode without requiring separate cell assemblies, thereby increasing the versatility of the electrochemical cell. The use of an independent overhead mechanical stirrer to rotate the rotating rod eliminates the need for an onboard DC motor and associated power supply and RPM control circuitry, thereby simplifying the cell design and improving user convenience while maintaining controlled hydrodynamic flow at the electrode surface.

The cell cover may be a detachable cell cover secured to the cell body by magnets. The cell cover may be a detachable cell cover secured to the cell body by a pair of PEEK rods. The cell cover may be a detachable cell cover secured to the cell body by a groove machined in the bottom of the cell cover.

The magnetic securing mechanism allows for convenient and rapid assembly and disassembly of the cell cover while maintaining a secure seal during operation.

The rotating rod may comprise inert material. The inert material may comprise polyetheretherketone (PEEK). The inert material may comprise Teflon. The rotating rod may be a polyetheretherketone (PEEK) rod. The cell body may comprise PEEK. The cell cover may comprise PEEK.

Fabricating the rotating rod, cell body, and/or cell cover from PEEK provides chemical compatibility with both aqueous and non-aqueous media, enabling the electrochemical cell to be used with organic solvents in addition to aqueous solutions.

The polyetheretherketone (PEEK) rod may comprise a slotted segmented distal end having a plurality of slots extending radially from a center of the polyetheretherketone (PEEK) rod.

The slotted segmented rod bottom with radially extending channels enhances the stirring effect at the electrode surface, enabling the generation of limiting currents that are equivalent to predictions from the Levich equation.

The slotted segmented rod bottom may comprise eight channels. Each channel may have a width of between 0.5 mm and 1.5 mm. Each channel may have a depth of between 5 mm to 8 mm. The electrochemical cell may be configured to generate limiting currents equivalent to predictions from the Levich equation during hydrodynamic voltammetry.

The specified channel dimensions have been optimized to provide efficient hydrodynamic flow at the electrode surface while maintaining the structural integrity of the rotating rod, thereby making the electrochemical cell functionally equivalent to a rotating disc electrode.

The cell body may comprise an electrically conductive disc integrated at a bottom portion thereof, wherein the electrically conductive disc defines the neck region having an opening aligned with a selected electrode. The electrically conductive disc may be configured to function as a built-in counter electrode.

The integration of an electrically conductive disc at the bottom of the cell body provides structural rigidity at the neck area and enables the electrically conductive disc to function as a built-in counter electrode during electrochemical measurements, which simplifies experimental setup.

The electrically conductive disc may be a stainless-steel disc. The stainless-steel disc may be electroplated with gold or gold and platinum layers, respectively.

The electrochemical cell may comprise a coupling rod configured to drive rotation of the rotating rod.

The coupling rod may comprise a stainless-steel rod partially inserted in a stainless-steel spring.

The spring-based coupling provides smooth mechanical coupling between the rotating rod and the overhead stirrer while accommodating minor misalignments, which reduces vibration and improves operational reliability.

The electrochemical cell may further comprise a PEEK tube disposed coaxially within the rotating rod and configured to deliver a carrier solution through a longitudinal channel of the rotating rod.

The coaxial PEEK tube enables carrier solution to flow through the longitudinal axis of the rotating rod, thereby providing dual functionality as both a batch cell and a flow cell within a single platform.

The electrochemical cell may further comprise a driving pulley configured to connect to an overhead mechanical stirrer and a secondary pulley attached to the rotating rod.

The electrochemical cell may comprise a rotational coupling connecting the driving pulley to the secondary pulley such that rotation of the driving pulley causes the secondary pulley to rotate.

The rotational coupling may comprise a rotation transfer belt connecting the driving pulley to the secondary pulley. The electrochemical cell may be configured to provide hydrodynamic flow at a selected electrode surface during sample injections through the longitudinal channel.

The pulley and belt configuration enables the carrier solution to flow through the longitudinal axis of the rotating rod while the rod rotates, thereby providing enhanced sensitivity through the combination of rotational hydrodynamic flow and wall-jet flow at the electrode surface during sample injections.

The electrochemical cell may further comprise spacers disposed between the cell body and the cell cover for adjusting a clearance between a bottom of the rotating rod and a selected electrode.

The electrochemical cell may comprise ferrule providing a seal between the PEEK tube and the rotating rod. The ferrule may comprise Teflon.

The spacers enable optimization of the hydrodynamic flow for different experimental requirements, and the Teflon ferrule provides a reliable seal that prevents leakage while accommodating the relative motion between the stationary inlet tube and the rotating rod.

The electrochemical cell of the first aspect may utilize a rotating rod having a smooth bottom surface as an alternative to the slotted segmented rod bottom. The cell body may be fabricated from acrylic as an alternative to PEEK for applications that do not require organic solvent compatibility. The stainless-steel disc integrated at the bottom of the cell body may be replaced with a disc made of another conductive material such as gold-plated stainless-steel.

The electrochemical cell may comprise a dual neck and dual rod arrangement. The dual neck and dual rod arrangement may be coupled for rotation either individually or simultaneously. The neck region may be a first neck region and the rotating rod may be a first rod configured to rotate. The electrochemical cell may comprise a second neck region. The electrochemical cell may comprise a second rod extending through the cell cover into the sample chamber.

The electrochemical cell may comprise a first neck and second neck. The first neck may have an internal diameter greater than an internal diameter of the second neck. The internal diameter of the first neck may be at least 50% greater than the internal diameter of the second neck.

The first neck may be configured for use with a rotating ring disc electrode configuration. The second neck may be configured for use with SPEC or single solid electrode configurations.

The electrochemical cell may comprise a first rod and a second rod, wherein the first rod is configured for use with the first neck, and the second rod is configured for use with the second neck. Each of the first neck and the second neck may comprise O-ring cavities.

Having a dual rod and neck arrangement may further increase the flexibility of the electrochemical cell, while also enabling the electrochemical cell to perform multiple analyses simultaneously.

According to a second aspect of the present disclosure, a method for configuring an electrochemical cell is provided. The method comprises selecting an orientation of a cell body on a cell base, wherein the cell base comprises a screen-printed electrode chip and a solid disc electrode, and wherein the orientation determines whether a neck region of the cell body aligns with the screen-printed electrode chip or the solid disc electrode, attaching a detachable cell cover to the cell body, wherein the cell cover supports a rotating rod configured to induce hydrodynamic flow at a surface of a selected electrode, and performing electrochemical analysis using the selected electrode.

The method enables users to rapidly configure the electrochemical cell for different electrode types without requiring separate cell assemblies, which improves experimental efficiency and reduces equipment costs.

Selecting the orientation may comprise attaching the cell body to the cell base using a subset of bolt holes arranged around a perimeter of the cell base.

The use of a subset of bolt holes for each orientation provides a simple and reliable mechanism for securing the cell body in the desired configuration.

The method may further comprise connecting a coupling rod extending from the cell cover to an overhead mechanical stirrer.

The overhead mechanical stirrer may be an independent overhead mechanical stirrer.

Connecting to an independent overhead stirrer provides convenient RPM control using standard laboratory equipment without requiring an onboard motor or external power supply and RPM control circuitry.

Performing electrochemical analysis may comprise performing hydrodynamic voltammetry with the rotating rod rotating to induce laminar flow at the surface of the selected electrode.

Hydrodynamic voltammetry with laminar flow enables quantitative electrochemical measurements with high signal-to-noise ratios and limiting currents that follow the Levich equation.

Performing electrochemical analysis may comprise performing flow injection analysis with a carrier solution flowing through a longitudinal channel of the rotating rod.

Flow injection analysis enables rapid and automated sample analysis with reduced sample consumption and wall-jet hydrodynamic flow at the electrode surface.

Performing electrochemical analysis may further comprise simultaneously rotating the rotating rod and flowing the carrier solution through the longitudinal channel to combine rotational hydrodynamic flow and wall-jet flow at the electrode surface.

The combination of rotational and wall-jet flow provides enhanced sensitivity compared to either flow mode alone, enabling improved detection limits during flow injection analysis.

The method of the second aspect may be performed with the electrochemical cell operating at controlled temperature using a water circulating bath connected to a double-jacket compartment of the cell body. The method may be performed with controlled atmosphere within the sample chamber by introducing gas through a gas port in the cell cover.

According to a third aspect of the present disclosure, a flow injection analysis system is provided. The flow injection analysis system comprises an electrochemical cell having a cell base comprising a screen-printed electrode chip and a solid disc electrode, a cell body disposed on the cell base and defining a sample chamber, and a detachable cell cover disposed on the cell body, a rotating rod extending through the cell cover into the sample chamber, the rotating rod comprising a longitudinal channel and a tube disposed coaxially therein for delivering a carrier solution, means for transferring rotation from an overhead mechanical stirrer to the rotating rod while permitting the carrier solution to flow through the longitudinal channel.

They system may comprise an injection valve configured to inject samples upstream into the carrier solution.

Integrating the flow injection analysis system aspect provides dual functionality as both a batch cell and a flow cell, enabling versatile electrochemical analysis with enhanced sensitivity through the combination of rotational hydrodynamic flow and wall-jet flow at the electrode surface during sample injections.

The means for transferring rotation may comprise a driving pulley, a secondary pulley attached to the rotating rod, and a rotation transfer coupling connecting the driving pulley to the secondary pulley.

The rotation transfer coupling may comprise a rotation transfer belt.

The pulley and belt configuration enables precise and slip-free rotation transfer between the overhead stirrer and the rotating rod while freeing the headspace above the rod for carrier solution delivery.

The flow injection analysis system may be configured to simultaneously operate in a batch mode with the rotating rod inducing rotational hydrodynamic flow and in a flow mode with the carrier solution providing wall-jet hydrodynamic flow at an electrode surface.

Simultaneous operation in both modes combines the benefits of rotational hydrodynamic flow and wall-jet flow, which enhances sensitivity compared to either mode alone.

The cell body may be attachable to the cell base in a first orientation to align a neck region with the screen-printed electrode chip and in a second orientation to align the neck region with the solid disc electrode.

The configurable orientation enables the flow injection analysis system to be used with either screen-printed electrode chips or solid disc electrodes depending on application requirements.

The flow injection analysis system of the third aspect may utilise a timing belt as the rotation transfer belt. The driving pulley and the secondary pulley may comprise GT2 pulleys. An outer diameter of the driving pulley may be selectable and/or configurable. The driving pulley may be selected to have an outer diameter of 12 mm or 36 mm, and the secondary pulley may have an outer diameter of 12 mm. The driving pulley may be selected such that a ratio between 1:1 to 3:1 of driving pulley to secondary pulley outer diameter respectively can be selected. The driving pulley may provide a rotation speed ratio of 1:1 or 1:3, respectively.

The person skilled in the art will appreciate that features disclosed in relation to one aspect of the present disclosure may be applicable to another aspect of the present disclosure, and vice versa.

The foregoing general description of the illustrative embodiments and the following detailed description thereof are merely exemplary aspects of the teachings of this disclosure and are not restrictive.

BRIEF DESCRIPTION OF THE DRAWINGS

The manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of the present disclosure and are therefore not to be considered limiting of its scope, for the present disclosure may admit to other equally effective embodiments.

Figure 1A:
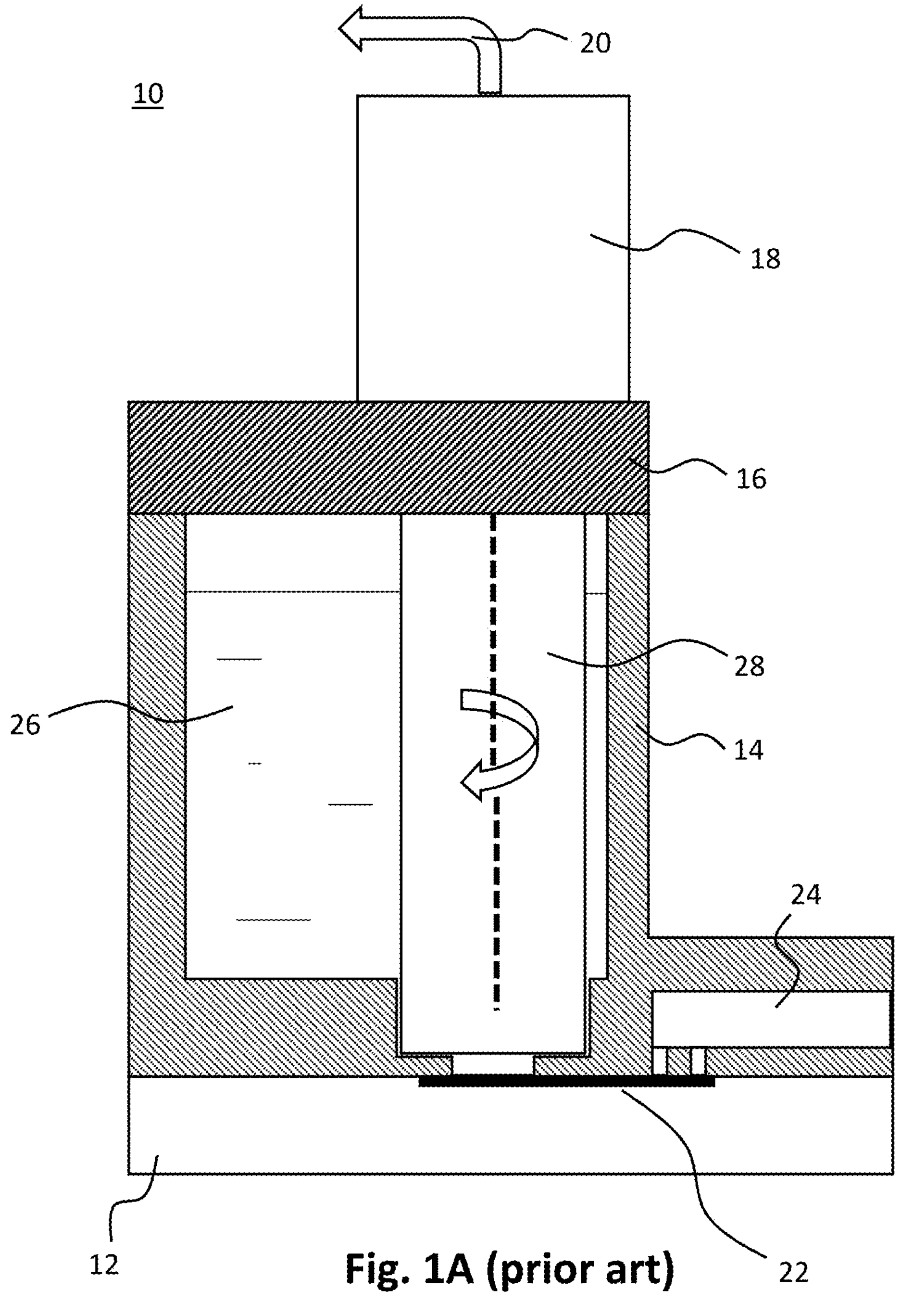
FIG. 1A illustrates a cross-sectional view of a prior art electrochemical cell applicable to screen printed electrodes.

The foregoing and other objects, features and advantages of the present invention, as well as the invention itself, will be more fully understood from the following description of preferred embodiments, when read together with the accompanying drawings.

DETAILED DESCRIPTION

The present disclosure relates to the field of electrochemical analysis cells, and more particularly but not exclusively to configurable electrochemical cells compatible with screen-printed electrodes and metallic electrodes for electroanalytical applications.

The principles of the present invention and their advantages are best understood by referring to FIG. 1 to FIG. 15. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Electrochemical cells for electrochemical analysis provide a controlled environment for performing various electrochemical measurements on samples. Such electrochemical cells may be configured to accommodate different types of electrodes, including screen-printed electrode chips and solid disc electrodes. Screen-printed electrode chips offer advantages such as disposability, reproducibility, and the ability to incorporate multiple electrode configurations on a single chip. Solid disc electrodes, including those fabricated from platinum, gold, or glassy carbon, may provide robust surfaces for repeated measurements and surface modifications.

Hydrodynamic flow at electrode surfaces may enhance mass transport of electroactive species to the electrode, thereby improving the sensitivity and reproducibility of electrochemical measurements. In stirred solution techniques, controlled convection may establish steady-state conditions at the electrode surface, resulting in limiting currents that are proportional to analyte concentration. The rotating disc electrode represents a well-characterized hydrodynamic system in which the relationship between limiting current and rotation rate follows the Levich equation. This equation relates the diffusion-limiting current to parameters including angular velocity, analyte bulk concentration, diffusion coefficient, and solution viscosity without requiring empirical fitting parameters.

Controlled stirring in electroanalytical applications may provide several benefits. Steady-state mass transport conditions may result in reduced capacitive currents and improved signal-to-noise ratios compared to quiescent solution techniques. The ability to tune mass transport independently of electrode kinetics may enable separation of diffusion-controlled and charge transfer-controlled regimes through Koutecký-Levich analysis. Hydrodynamic techniques may also facilitate quantitative determination of diffusion coefficients, concentrations, and kinetic parameters from electrochemical measurements.

Electrochemical cells for electrochemical analysis may be designed to operate in both stirred and non-stirred solution modes. Non-stirred solution techniques, such as cyclic voltammetry and chronocoulometry, may be performed in the same cell used for other techniques which are commonly used in stirred solutions, such as linear sweep voltammetry and amperometry. The ability to perform multiple electrochemical techniques in a single cell may reduce sample handling and improve measurement efficiency. Electrochemical cells may also be configured to operate with controlled atmosphere and temperature conditions, expanding the range of samples and experimental conditions that may be investigated.

Compatibility with both aqueous and non-aqueous media may extend the applicability of electrochemical cells to a broader range of electrochemical systems. Materials such as polyetheretherketone (PEEK) may provide chemical resistance to organic solvents while maintaining mechanical stability. The integration of temperature control features may enable measurements at controlled temperatures, which may be relevant for kinetic studies and for samples that require specific temperature conditions.

Flow injection analysis represents another mode of electrochemical detection in which samples are injected into a flowing carrier stream and transported to a detector. Flow cells for electrochemical detection may employ various hydrodynamic configurations, including wall-jet and channel electrode arrangements. The combination of batch cell functionality with flow injection capability in a single electrochemical cell may provide versatility for different analytical applications.

Referring to FIG. 1A, a prior art screen-printed electrochemical cell 10 is shown in cross-sectional view. The prior art screen-printed electrochemical cell 10 includes a cell base 12 positioned at the bottom of the assembly. A cell body 14 is disposed above the cell base 12 and defines a chamber configured to contain a sample 26. The cell body 14 is secured to the cell base 12 by a set of bolts (not shown). A screen-printed electrode chip 22 is positioned between the cell base 12 and the cell body 14. An electrical contact adaptor 24 provides electrical connections to the screen-printed electrode chip 22, enabling communication between the electrodes on the screen-printed electrode chip 22 and external instrumentation.

With continued reference to FIG. 1A, a cell cover 16 is positioned above the cell body 14 and encloses an upper portion of the prior art screen-printed electrochemical cell 10. A DC motor 18 is mounted on top of the cell cover 16. The DC motor 18 is connected to a power supply and RPM control 20, which is external to the prior art screen-printed electrochemical cell 10. A polyetheretherketone (PEEK) rod 28 extends downward from the DC motor 18 through the cell cover 16 and into the sample 26 within the cell body 14. The DC motor 18 imparts rotational motion to the polyetheretherketone (PEEK) rod 28, thereby inducing hydrodynamic flow at the surface of the screen-printed electrode chip 22.

The prior art screen-printed electrochemical cell 10 configuration presents several limitations. The DC motor 18 mounted on the cell cover 16 requires connection to the external power supply and RPM control 20, which adds complexity to the system. The power supply and RPM control 20 includes circuitry for controlling the rotational speed of the DC motor 18, and this external circuitry may limit the user-friendliness of the prior art screen-printed electrochemical cell 10. The onboard DC motor 18 configuration may also introduce electrical noise that affects the detection limit of electrochemical measurements. Additionally, the prior art screen-printed electrochemical cell 10 may have limited compatibility with solid disc electrodes and may not provide limiting currents that are quantitatively equivalent to predictions from the Levich equation for rotating disc electrode systems.

Figures 1B, 1C:
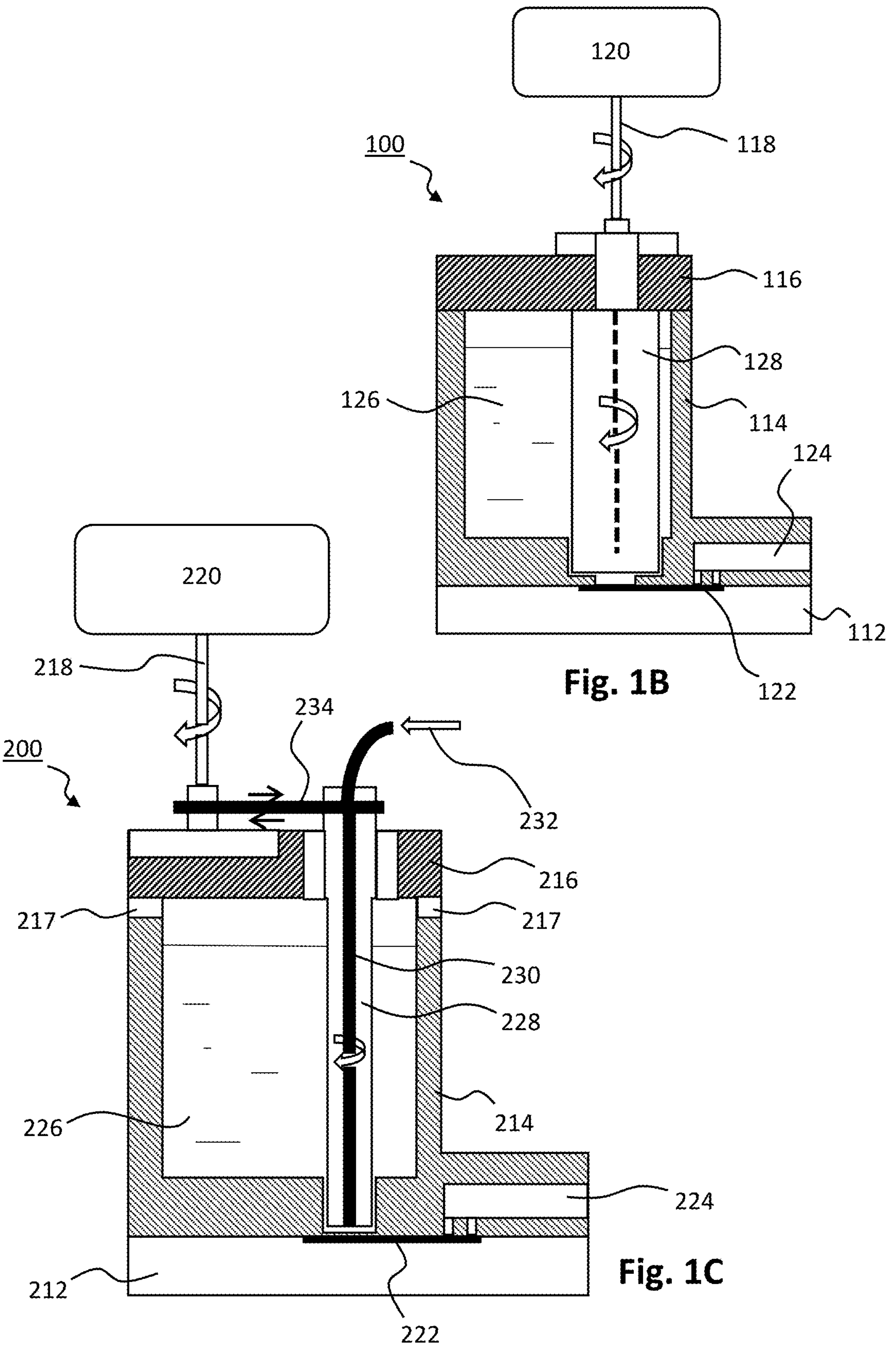
FIG. 1B illustrates a cross-sectional view of an electrochemical cell according to embodiments of the present disclosure.
FIG. 1C illustrates a cross-sectional view of an electrochemical cell according to embodiments of the present disclosure.

Referring to FIG. 1B, an electrochemical cell according to an embodiment of the present disclosure 100 is shown in cross-sectional view. The electrochemical cell 100 includes a cell base 112 positioned at the bottom of the assembly. A cell body 114 is disposed above the cell base 112 and defines a chamber configured to contain a sample 126. A screen-printed electrode chip 122 is positioned on the cell base 112. An electrical contact adaptor 124 provides electrical connections to the screen-printed electrode chip 122, enabling communication between electrodes on the screen-printed electrode chip 122 and external instrumentation.

With continued reference to FIG. 1B, a cell cover 116 is positioned above the cell body 114. A removable coupling rod 118 extends from the cell cover 116 and connects to an independent overhead mechanical stirrer 120 positioned above the electrochemical cell 100. A polyetheretherketone (PEEK) rod 128 extends downward from the cell cover 116 into the sample 126 contained within the cell body 114. The polyetheretherketone (PEEK) rod 128 is rotatable via the coupling rod 118 connected to the independent overhead mechanical stirrer 120. The independent overhead mechanical stirrer 120 eliminates the need for an onboard DC motor and an external RPM control circuit, as the independent overhead mechanical stirrer 120 integrates rotational speed control within a single unit that is common and inexpensive laboratory equipment.

The electrochemical cell 100 may be compatible with aqueous media. The electrochemical cell 100 may also be compatible with non-aqueous media including organic solvents such as acetonitrile. The electrochemical cell 100 may operate at controlled temperature using a water circulating bath. In some embodiments, the electrochemical cell 100 may operate at ambient temperature of 23±1° C. The electrochemical cell 100 may operate with controlled atmosphere through gas inlet and outlet ports provided in the cell cover 116. In embodiments, the electrochemical cell 100 may operate at ambient atmosphere.

Referring to FIG. 1C, an electrochemical cell according to an embodiment of the present disclosure 200 is shown in cross-sectional view. Unless otherwise stated, the electrochemical cell 200 shares similar design details to the electrochemical cell 100. The electrochemical cell 200 includes a cell base 212 positioned at the bottom of the assembly. A cell body 214 is disposed above the cell base 212 and defines a chamber configured to contain a sample 226. A cell cover 216 is positioned above the cell body 214. Spacer 217 (of different thicknesses) is positioned between the cell body 214 and the cell cover 216. When the spacer 217 is removed, the clearance between the rotating rod and the electrode underneath is at the minimum distance. The minimum distance may be less than or equal to 1.0 mm.

With continued reference to FIG. 1C, a coupling rod 218 connects to an independent overhead mechanical stirrer 220 positioned above the electrochemical cell 200. A screen-printed electrode chip 222 is positioned on the cell base 212. An electrical contact adaptor 224 provides electrical connections to the screen-printed electrode chip 222. A polyetheretherketone (PEEK) rod 228 extends into the sample 226 contained within the cell body 214. A PEEK tube 230 is positioned coaxially within the polyetheretherketone (PEEK) rod 228 to allow a carrier solution or mobile phase in 232 to flow through a longitudinal axis of the polyetheretherketone (PEEK) rod 228. A rotation transfer belt 234 couples the independent overhead mechanical stirrer 220 to the polyetheretherketone (PEEK) rod 228, enabling rotation of the polyetheretherketone (PEEK) rod 228 while permitting fluid flow through the PEEK tube 230.

The electrochemical cell 200 provides dual functionality as both a batch cell and a flow cell through the combination of the rotation transfer belt 234 and the PEEK tube 230 for carrier solution delivery. The independent overhead mechanical stirrer 220 eliminates the need for an onboard DC motor and an external RPM control circuit. The electrochemical cell 200 may be compatible with aqueous media. The electrochemical cell 200 may also be compatible with non-aqueous media including organic solvents such as acetonitrile. The electrochemical cell 200 may operate at controlled temperature using a water circulating bath. In some cases, the electrochemical cell 200 may operate at ambient temperature of 23±1° C. The electrochemical cell 200 may operate with controlled atmosphere through gas inlet and outlet ports. In some cases, the electrochemical cell 200 may operate at ambient atmosphere.

Figure 2A:
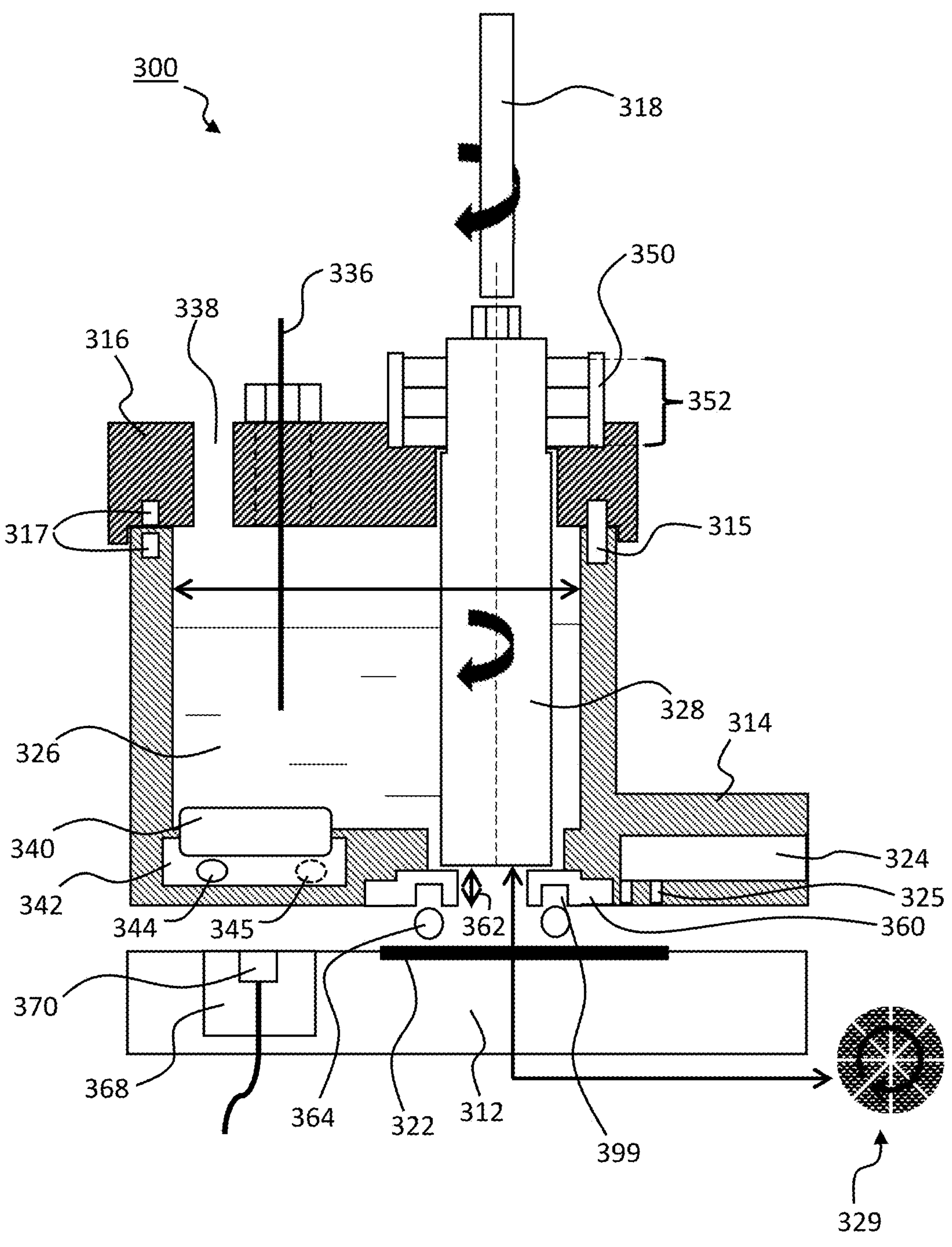
FIG. 2A illustrates a detailed cross-sectional view of the electrochemical cell of FIG. 1B, according to embodiments of the present disclosure.

Referring to FIG. 2A, a more detailed FIG. 300 of the electrochemical cell of FIG. 1B (100) is shown in cross-sectional view. The electrochemical cell 300 includes a cell base 312 positioned at the bottom of the assembly. A cell body 314 is disposed above the cell base 312. A cell cover 316 is positioned above the cell body 314. The cell base 312, the cell body 314, and the cell cover 316 may be fabricated from PEEK (polyetheretherketone) material to expand applicability to organic solvent applications and to provide compatibility with both aqueous and non-aqueous media. In some cases, the cell base 312, the cell body 314, and the cell cover 316 may alternatively be fabricated from clear cast acrylic sheets. In some cases, the cell base 312, the cell body 314, and the cell cover 316 may alternatively be fabricated from translucent acrylic sheets. The electrochemical cell 300 may be fabricated using CNC machining for design and operation file generation. In some embodiments, a CNC machine Model D-23 miniTRON may be used for fabrication.

With continued reference to FIG. 2A, the cell cover 316 is secured in position by magnets 317. The magnets 317 may comprise two pairs of rod magnets with a diameter of 6 mm and a length of 12 mm. The cell cover 316 may also be secured by a PEEK rod 315 attached to the cell cover 316 and positioned within a cavity drilled in the cell body 314 to prevent the rotational drag of the cell cover 316 by the rotating action delivered by the coupling rod 318. The cell cover 316 may include a rectangular groove (2-3 mm depth) of similar foot print to the top of the cell body to prevent rotational drag of the cell cover 316.

A coupling rod 318 extends from a top of the cell cover 316 and is configured to connect to the independent overhead mechanical stirrer 120. The coupling rod 318 may comprise a stainless-steel rod with a length of 65 mm and a diameter of 6 mm inserted in a stainless-steel spring with a length of 90 mm, an inner diameter of 6 mm, and a wire diameter of 1.6 mm. The coupling rod 318 may be coupled to an Allen Hex socket bolt screwed to a top of a polyetheretherketone (PEEK) rod 328 by means of a short piece of hexagonal rod of 5 mm. The independent overhead mechanical stirrer 120 may have a rotating range of 100 to 2000 rpm.

As further shown in FIG. 2A, the cell cover 316 incorporates a gas in/out port 336 (there are two ports but only one is shown in the figure for simplicity) and a multipurpose opening 338. The gas in/out port 336 may be used for experiments that require controlled gas environment. The multipurpose opening 338 may be used for sample injections, inserting a thermometer, or inserting an external reference electrode. When not in use, the multipurpose opening 338 may be closed with an appropriate stopper as needed.

Within the cell cover 316, three stacked stainless-steel bearings 352 are fitted within a stainless-steel cylinder 350. The three stacked stainless-steel bearings 352 may have an inner diameter of 15 mm and an outer diameter of 35 mm. The stainless-steel cylinder 350 and associated bearings 352 support the polyetheretherketone (PEEK) rod 328. The polyetheretherketone (PEEK) rod 328 extends downward through the cell cover 316 into a sample 326 contained within the cell body 314. The polyetheretherketone (PEEK) rod 328 may have a diameter of 16 mm and a length of 90 mm. The three stacked stainless-steel bearings 352 maximize stability of a vertical rotation axis of the polyetheretherketone (PEEK) rod 328.

With continued reference to FIG. 2A, a bottom view of the PEEK rod 329 is shown adjacent to the main cross-sectional view. The bottom view of the PEEK rod 329 illustrates a slotted geometry of a rod bottom that enhances hydrodynamic flow at an electrode surface. The bottom of the polyetheretherketone (PEEK) rod 328 may include eight machined channels with 1 mm width and 5 to 8 mm depth for enhanced stirring effect.

The cell body 314 includes a stainless-steel block 340 positioned at a bottom portion of the cell body 314. The stainless-steel block 340 integrates with a double-jacket compartment for water thermostat 342. The double-jacket compartment for water thermostat 342 includes a thermostat in 344 port and a thermostat out 345 port for circulating thermostated water to control sample temperature. The double-jacket compartment for water thermostat 342 is positioned at the bottom of the cell body 314 with a protruded stainless-steel cylindrical disc for efficient heat exchange between circulated thermostated water and the sample 326. The cell body 314 may include side inlet and outlet ports for circulating water thermostat.

As further shown in FIG. 2A, a stainless-steel disc 360 is integrated at a bottom of the cell body 314. The stainless-steel disc 360 forms a neck region with a depth (d) 362. The depth (d) 362 may be optimized at between 2 mm to 4 mm. The depth (d) 362 may be approximately 3.0 mm. A neck diameter may be 7.25 mm. The stainless-steel disc 360 imparts rigidity at the neck area and at an O-ring cavity 399. The stainless-steel disc 360 may also act as a built-in counter electrode. The stainless-steel disc 360 may be sealed to the cell body 314 with epoxy. An O-ring 364 is positioned within the neck region to provide sealing between the cell body 314 and the vicinity of the electrode positioned on top of the cell base 312. The O-ring 364 may have a 9 mm inner diameter and a 2 mm cross section. The O-ring 364 may be made of FKM material. In some cases, the O-ring 364 may be made of NBR or silicone material. An O-ring cavity may have a depth of 1.5 mm.

The cell base 312 supports a screen-printed electrode chip 322. An electrical contact adaptor 324 with connector pins 325 provides electrical connections to electrodes on the screen-printed electrode chip 322. The electrical contact adaptor 324 may include six spring-loaded connectors. A slap may be used to retain the electrical contact adaptor 324 in place. The cell base 312 also accommodates a metal disc electrode 370. The metal disc electrode 370 is insulated by a PEEK insulator 368. The metal disc electrode 370 may be insulated in PEEK rods with a diameter of 13.0 mm and a length of 20.0 mm The electrochemical cell 300 may be compatible with sample volumes ranging from 0.75 mL to 60 mL.

Figure 2B:
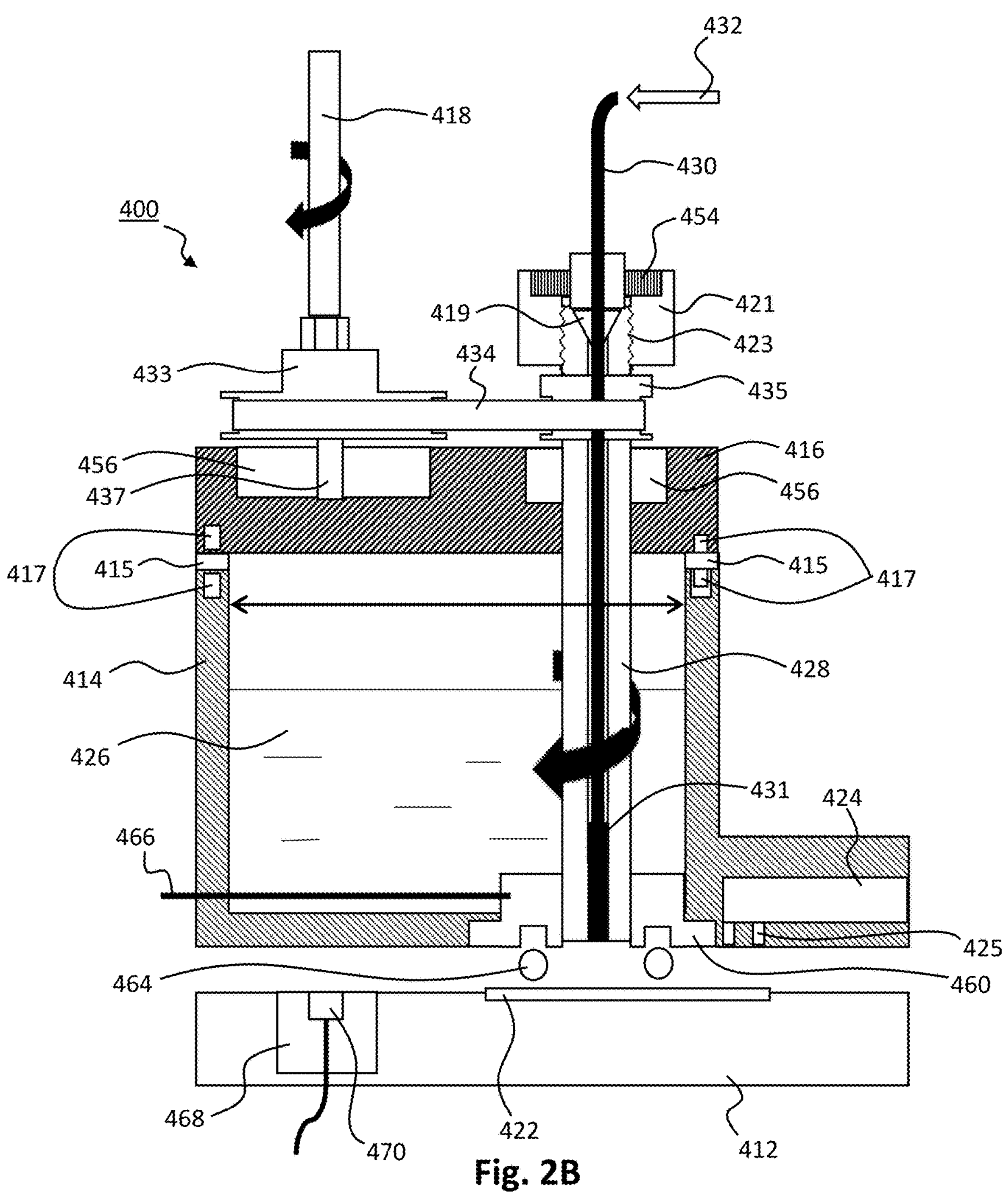
FIG. 2B illustrates a detailed cross-sectional view of the electrochemical cell of FIG. 1C, according to embodiments of the present disclosure.

Referring to FIG. 2B, a more detailed FIG. 400 of the electrochemical cell of FIG. 1C (200) is shown in cross-sectional view. The electrochemical cell 400 includes a cell base 412 positioned at the bottom of the assembly. A cell body 414 is disposed above the cell base 412. A cell cover 416 is positioned above the cell body 414. Spacers 415 are positioned between the cell body 414 and the cell cover 416 on both sides of the assembly. The spacers 415 may have different thicknesses and may be placed between the cell body 414 and the cell cover 416 to adjust a clearance between a rod bottom and an electrode surface. When the spacer 415 is removed, the clearance between the bottom of the rotating rod and the electrode surface is 1.0 mm. Magnets 417 are located on either side of the cell cover 416 to secure the cell cover 416 in place.

With continued reference to FIG. 2B, a coupling rod 418 extends upward from the cell cover 416 and connects to the independent overhead mechanical stirrer 220. The coupling rod 418 interfaces with a driving pulley 433. The driving pulley 433 may be a GT2 pulley with 20 teeth and an outer diameter of 12 mm. In some cases, the driving pulley 433 may have 60 teeth and an outer diameter of 36 mm. The driving pulley 433 is connected via a rotation transfer belt 434 to a secondary (rod) pulley 435. The rotation transfer belt 434 may be a timing belt with a length of 122 mm. In some cases, the rotation transfer belt 434 may have a length of 158 mm depending on pulley configuration. The secondary (rod) pulley 435 may have an outer diameter of 12 mm. The driving pulley 433 and the secondary (rod) pulley 435 may be selected to achieve a 1:1 rpm ratio. In some cases, the driving pulley 433 and the secondary (rod) pulley 435 may be selected to achieve a 1:3 rpm ratio. The driving pulley 433 is positioned by means of an 8-mm brass shaft 437 fixed to the inner diameter of a stainless-steel bearing 456 fitted into the cell cover 416.

As further shown in FIG. 2B, a Teflon ferrule 419 is used for sealing a PEEK tube 430 in the rotating rod of the electrochemical cell 400. A PEEK cap 421 is positioned on an upper portion of the assembly. The PEEK cap 421 includes a thread for unscrewing PEEK cap 423. The thread for unscrewing PEEK cap 423 allows for convenient assembly and disassembly of the rotating rod assembly.

The PEEK tube 430 extends vertically through the cell cover 416 and connects to a carrier solution/mobile phase in 432 at a top of the assembly. A stainless-steel tube 431 is positioned within the PEEK tube 430. The PEEK tube 430 may be made of PEEK material with an outer diameter of 1.6 mm. The stainless-steel tube 431 inserted within a rotating rod has an inner diameter matching the 1.6 mm outer diameter of the PEEK tube 430. A stainless-steel bearing 454 is positioned near the PEEK cap 421. Stainless-steel bearings 456 are located on both sides of the cell cover 416 to support rotating components of the electrochemical cell 400.

With continued reference to FIG. 2B, a polyetheretherketone (PEEK) rod 428 extends downward from the cell cover 416 into a sample 426 contained within the cell body 414. The polyetheretherketone (PEEK) rod 428 may have a diameter of approximately 8.0 mm. The polyetheretherketone (PEEK) rod 428 is configured to rotate and induce hydrodynamic flow at an electrode surface. A lower part of the polyetheretherketone (PEEK) rod 428 is positioned within a neck cylinder of the cell body 414. A neck height (d) may be 8 mm for the electrochemical cell 400 configuration. A clearance between a bottom of the polyetheretherketone (PEEK) rod 428 and the electrode surface may be 1.0 mm. The bottom of the polyetheretherketone (PEEK) rod 428 has a smooth non-slotted geometry for reproducible wall-jet flow at the electrode surface.

A screen-printed electrode chip 422 is positioned in a designated cavity machined on the top surface of the cell base 412. An electrical contact adaptor 424 with connector pins 425 provides electrical connections to the screen-printed electrode chip 422. A stainless-steel disc 460 is integrated into the cell body 414 above the screen-printed electrode chip 422. The stainless-steel disc 460 may have a thickness of 10 mm. An O-ring 464 provides sealing between the cell body 414 and the cell base 412. An electrical contact of the external counter electrode 466 is positioned adjacent to the O-ring 464.

As further shown in FIG. 2B, the cell base 412 also accommodates a metal disc electrode 470. The metal disc electrode 470 is insulated by a PEEK insulator 468. The metal disc electrode 470 may be insulated in PEEK rods with a diameter of 13.0 mm and a length of 20.0 mm. The cell body 414 and the cell base 412 may be connected using four 4-mm stainless-steel bolts. Stainless-steel insert nuts of 4 mm may be used for assembly. This configuration allows the electrochemical cell 400 to be compatible with both screen-printed electrode chips and solid disc electrodes.

The pulley and belt system of the electrochemical cell 400 enables carrier solution flow through the longitudinal axis of the polyetheretherketone (PEEK) rod 428 for dual batch/flow cell operation. The carrier solution/mobile phase in 432 flows through the PEEK tube 430 and the stainless-steel tube 431 positioned coaxially within the polyetheretherketone (PEEK) rod 428. The rotation transfer belt 434 transfers rotational motion from the driving pulley 433 to the secondary (rod) pulley 435, which is attached to the polyetheretherketone (PEEK) rod 428. This configuration permits the polyetheretherketone (PEEK) rod 428 to rotate while the PEEK tube 430 remains stationary, allowing continuous carrier solution flow during rotation.

The electrochemical cell 400 may operate in a flow injection mode where the electrochemical cell 400 acts as a waste reservoir. In the flow injection mode, peak shape may be obtained by local sample dilution. The electrochemical cell 400 may operate with injection loop volumes of 100 μL. In some cases, the electrochemical cell 400 may operate with injection loop volumes of 250 μL. In some cases, the electrochemical cell 400 may operate with injection loop volumes of 500 μL. A carrier solution flow rate may be 0.75 mL/min for flow injection analysis operation. In some cases, the carrier solution flow rate may be 1.5 mL/min. The electrochemical cell 400 may achieve hydrodynamic voltammetry of sample volumes as small as 50 microliters.

Figure 3:
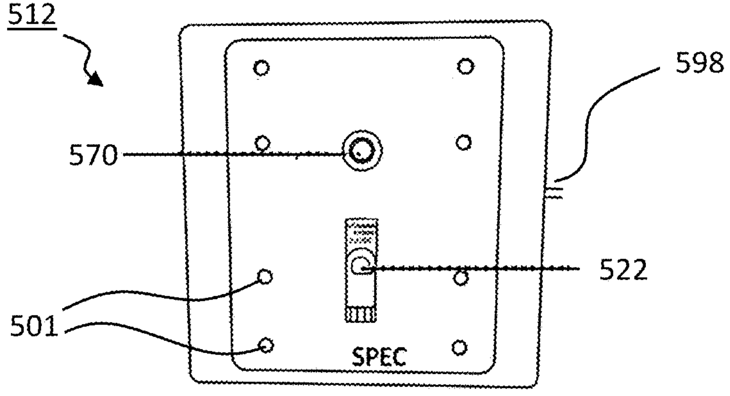
FIG. 3 illustrates a top view of a cell base configured to support two electrode types, according to embodiments of the present disclosure.

Referring to FIG. 3, a cell base 512 is shown in top view. The cell base 512 is configured to accommodate both a screen-printed electrode chip 522 and a solid gold disc electrode 570. Eight holes for bolts 501 are arranged around a perimeter of the cell base 512. The eight holes for bolts 501 are used to connect the cell base 512 to the cell body. Four bolts may be used at a time based on an orientation of the cell body to align a neck opening to a selected electrode. The screen-printed electrode chip 522 is positioned on one side of the cell base 512. The gold disc electrode 570 is shown as a circular element positioned on an opposite side of the cell base 512. The cell base 512 includes an electrical connection 598 to the gold disc electrode 570.

With continued reference to FIG. 3, the dual-electrode configuration of the cell base 512 allows the electrochemical cell to be assembled in two different orientations depending on whether a user wishes to utilize the screen-printed electrode chip 522 or the gold disc electrode 570 for electrochemical measurements.

The screen-printed electrode chip 522 may include a platinum working electrode. In embodiments, the screen-printed electrode chip 522 may comprise a gold working electrode. In embodiments, the screen-printed electrode chip 522 may comprise a carbon working electrode. In embodiments, the screen-printed electrode chip 522 may comprise an ordered mesoporous carbon working electrode. In embodiments, the screen-printed electrode chip 522 may comprise a single wall carbon nanotube working electrode. A pseudo-reference electrode on the screen-printed electrode chip 522 may be screen-printed silver. A counter electrode on the screen-printed electrode chip 522 may be platinum, gold, or carbon depending on a model of the screen-printed electrode chip 522. A working electrode on a gold screen-printed electrode chip may have a diameter of 4 mm.

The gold disc electrode 570 may be replaced with other solid disc electrodes. In some cases, a solid disc electrode may be platinum with a diameter of 1.6 mm. In some cases, a solid disc electrode may be glassy carbon with a diameter of 3.0 mm. In some cases, a solid disc electrode may be gold with a diameter of 3.2 mm. In some cases, a solid disc electrode may be electroplated gold with a diameter of 7.2 mm.

Figure 4:
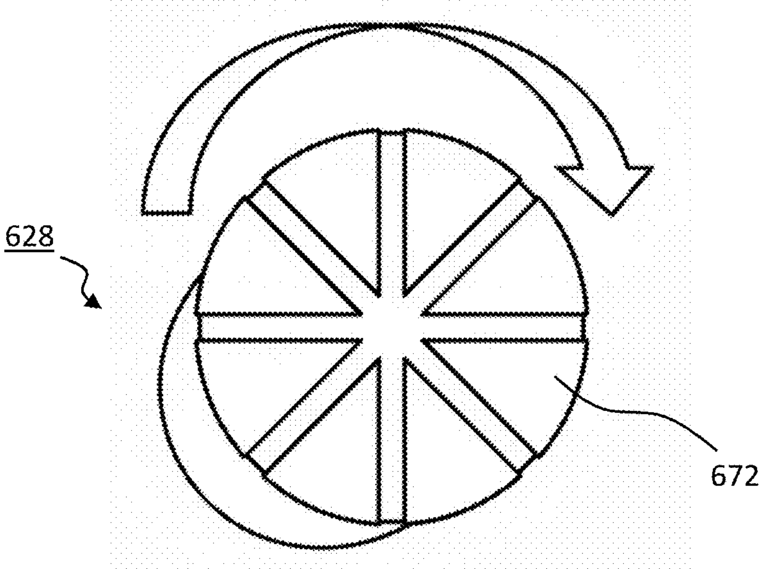
FIG. 4 illustrates a bottom view of a rotating rod with a slotted bottom surface, according to embodiments of the present disclosure.

Referring to FIG. 4, a polyetheretherketone (PEEK) rod 628 is shown in bottom view. The polyetheretherketone (PEEK) rod 628 features a slotted segmented rod bottom 672 (distal end). The slotted segmented rod bottom 672 comprises eight channels machined into a bottom surface of the polyetheretherketone (PEEK) rod 628. The eight channels extend radially from a center of the polyetheretherketone (PEEK) rod 628 toward an outer edge of the polyetheretherketone (PEEK) rod 628, creating a segmented pattern. An arrow in FIG. 4 indicates that the polyetheretherketone (PEEK) rod 628 rotates about its longitudinal axis.

With continued reference to FIG. 4, the slotted segmented rod bottom 672 is designed to enhance a stirring effect and achieve efficient hydrodynamic flow at an electrode surface. The eight machined channels of the slotted segmented rod bottom 672 may have a width of 1 mm and a depth of 5 to 8 mm. The slotted geometry of the polyetheretherketone (PEEK) rod 628 enables generation of limiting currents that are equivalent to predictions from the Levich equation. The slotted segmented rod bottom 672 configuration makes the electrochemical cell functionally equivalent to a rotating disc electrode.

The electrochemical cell may employ the screen-printed electrode chip 522 in a dual working electrode configuration. In the dual working electrode configuration, a screen-printed working electrode on the screen-printed electrode chip 522 may serve as a first working electrode and a screen-printed counter electrode on the screen-printed electrode chip 522 may serve as a second working electrode. The electrochemical cell may operate with the built-in counter electrode provided by the stainless-steel disc (360 in FIGS. 2A and 460 in FIG. 2B) when using the dual working electrode configuration.

Figure 5:
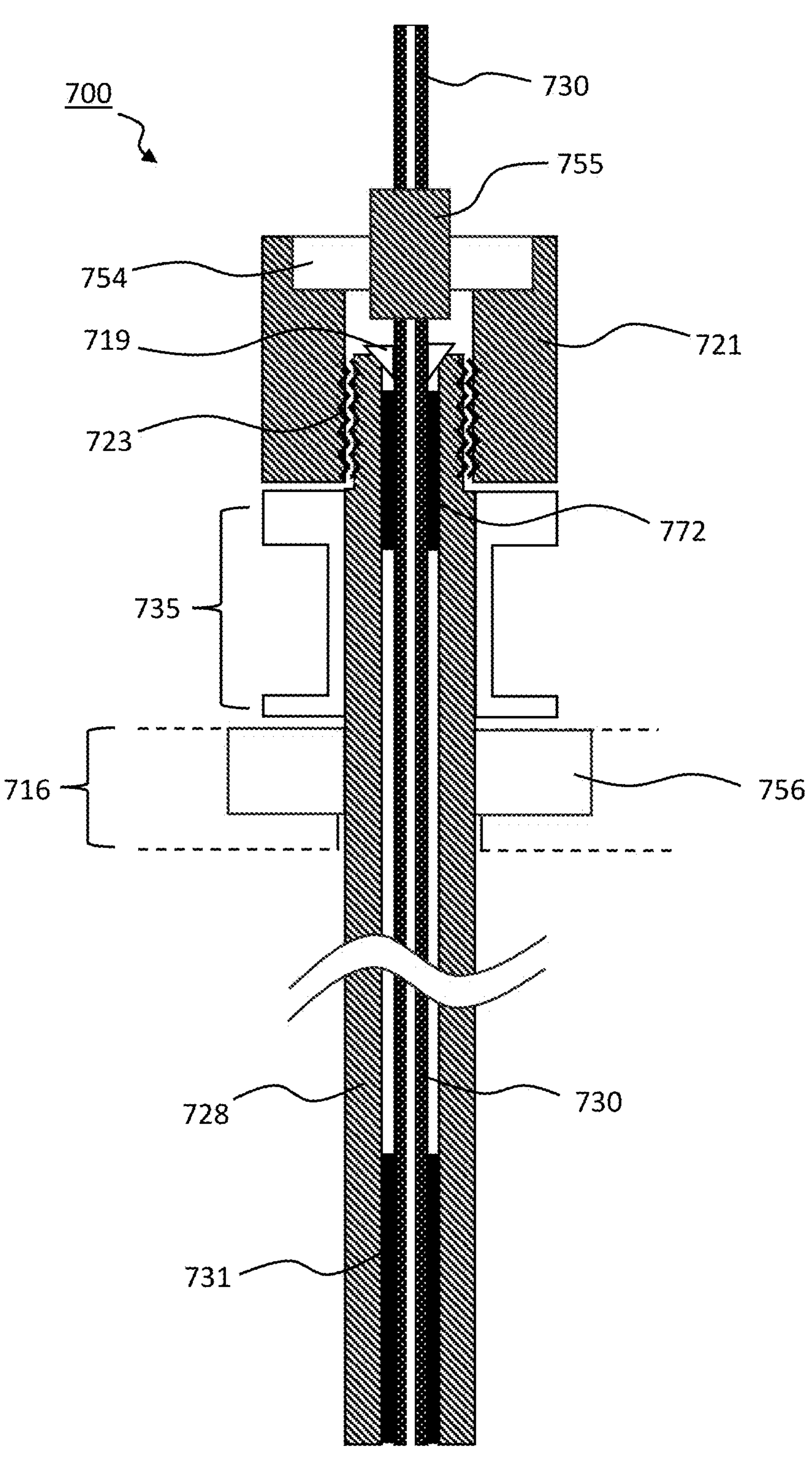
FIG. 5 illustrates a cross-sectional view of a rotating rod assembly, according to embodiments of the present disclosure.

Referring to FIG. 5, a rotating rod assembly 700 (as shown in FIG. 2B) is illustrated in cross-sectional view. The rotating rod assembly 700 corresponds to the rotating rod components previously described in connection with the electrochemical cell 200 and the electrochemical cell 400. The rotating rod assembly 700 is positioned in a cell cover 716 that supports the rotating components of the assembly.

With continued reference to FIG. 5, a PEEK cylinder 755 is positioned within the inner diameter of a stainless-steel bearing 754 that supports rotational movement of the assembly around the central non-rotating PEEK tube 730. A secondary (rod)/receiving pulley 735 is connected to the rotating components of the rotating rod assembly 700. The secondary (rod)/receiving pulley 735 receives rotational motion from the driving pulley 433 via the rotation transfer belt 434.

A polyetheretherketone (PEEK) rod 728 extends vertically and serves as a primary rotating element. The polyetheretherketone (PEEK) rod 728 is supported by a stainless-steel bearing 756 positioned within the cell cover 716. A stainless-steel tube 772 is inserted within the polyetheretherketone (PEEK) rod 728 to support the PEEK tube 730 for carrier solution flow.

As further shown in FIG. 5, a PEEK tube 730 extends coaxially through the rotating rod assembly 700 to deliver carrier solution into the system. The PEEK tube 730 connects to a stainless-steel tube 731 that interfaces with the stainless-steel tube 772 within the polyetheretherketone (PEEK) rod 728. The stainless-steel tube 731 and the stainless-steel tube 772 may have matching inner and outer diameters to provide a close fit that prevents upward solution penetration within the polyetheretherketone (PEEK) rod 728. The outer diameter of the PEEK tube 730 may be 1.6 mm, and the inner diameter of the stainless-steel tube 772 may match the 1.6 mm outer diameter of the PEEK tube 730.

With continued reference to FIG. 5, a Teflon ferrule 719 provides a seal between non-rotating inlet components and rotating rod components of the rotating rod assembly 700. The Teflon ferrule 719 is positioned to interface between the PEEK tube 730 and the stainless-steel tube 731. The Teflon ferrule 719 enables smooth integration between the non-rotating PEEK tube 730 and the rotating polyetheretherketone (PEEK) rod 728.

A PEEK cap 721 is positioned at a top of the rotating rod assembly 700. The PEEK cap 721 includes a thread for unscrewing PEEK cap 723. The thread for unscrewing PEEK cap 723 allows for convenient assembly and disassembly of the rotating rod assembly 700. The PEEK cap 721 may be unscrewed to access internal components of the rotating rod assembly 700 for maintenance or replacement.

The configuration of the rotating rod assembly 700 enables carrier solution to flow through a longitudinal axis of the polyetheretherketone (PEEK) rod 728 while the polyetheretherketone (PEEK) rod 728 rotates. The PEEK tube 730 remains stationary during operation while the polyetheretherketone (PEEK) rod 728 rotates around the PEEK tube 730. The close fit between the outer diameter of the PEEK tube 730 and the inner diameter of the stainless-steel tube 772 eliminates the possibility of solution penetration upward within the polyetheretherketone (PEEK) rod 728. The friction between the PEEK material of the PEEK tube 730 and the stainless-steel material of the stainless-steel tube 772 may provide smooth operation during rotation.

Figure 6:
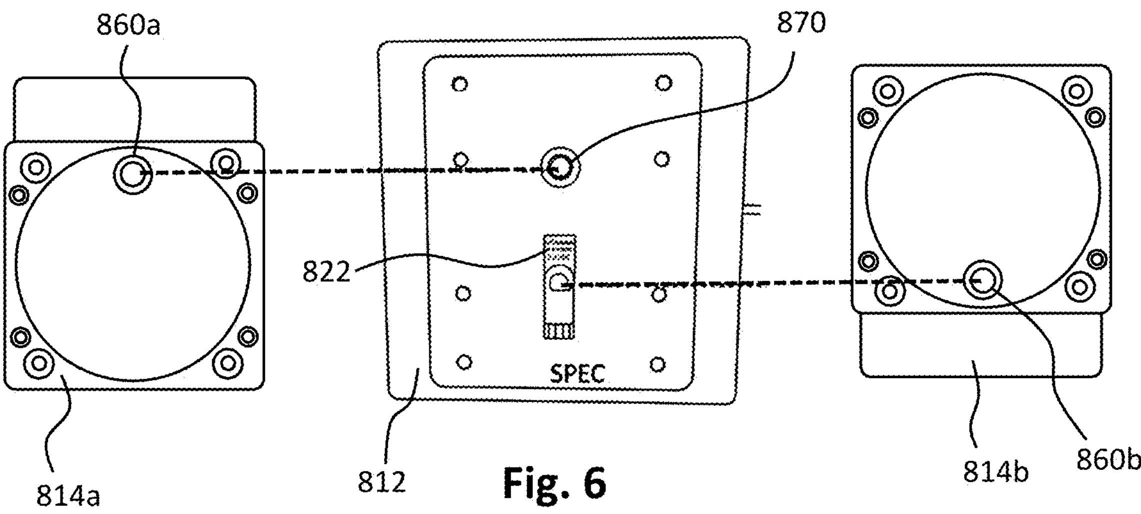
FIG. 6 illustrates two assembly orientations of an electrochemical cell, according to embodiments of the present disclosure.

Referring to FIG. 6, a cell base 812 is shown with two possible assembly orientations of the cell body. The cell base 812 is positioned centrally in the figure and is configured to support both screen-printed electrode chips and solid disc electrodes. A cell body oriented to utilise the solid disc electrode 814*a* is shown on one side of the cell base 812. A cell body oriented to utilise the screen-printed electrode chip 814*b* is shown on an opposite side of the cell base 812.

With continued reference to FIG. 6, a screen-printed electrode chip 822 is shown positioned on the cell base 812 in a centre of the figure. A stainless-steel disc 860*a* is visible at a bottom of the cell body oriented to utilise the solid disc electrode 814*a*. A stainless-steel disc 860*b* is visible at a bottom of the cell body oriented to utilise the screen-printed electrode chip 814*b*. The stainless-steel disc 860*a* and the stainless-steel disc 860*b* provide structural support at a neck area of each cell body configuration and may function as an external counter electrode during electrochemical measurements.

As further shown in FIG. 6, a solid disc electrode 870 is shown. The cell base 812 includes multiple holes around a perimeter of the cell base 812 for bolts that connect the cell base 812 to the cell body. The two assembly orientations demonstrate versatility of the electrochemical cell design, allowing users to select either the solid disc electrode 870 or the screen-printed electrode chip 822 depending on application requirements.

The cell body oriented to utilise the solid disc electrode 814*a* may be assembled with the cell base 812 when a user wishes to perform electrochemical measurements using the solid disc electrode 870. In this configuration, a neck opening of the cell body oriented to utilise the solid disc electrode 814*a* aligns with the solid disc electrode 870 positioned on the cell base 812. The cell body oriented to utilise the screen-printed electrode chip 814*b* may be assembled with the cell base 812 when a user wishes to perform electrochemical measurements using the screen-printed electrode chip 822. In this configuration, a neck opening of the cell body oriented to utilise the screen-printed electrode chip 814*b* aligns with the screen-printed electrode chip 822 positioned on the cell base 812.

With continued reference to FIG. 6, the assembly orientation may be selected by rotating the cell body 180 degrees relative to the cell base 812 and using a corresponding set of bolt holes to secure the cell body to the cell base 812. Four bolts may be used at a time based on the selected orientation of the cell body to align the neck opening to the selected electrode. The stainless-steel disc 860*a* integrated at the bottom of the cell body oriented to utilise the solid disc electrode 814*a* and the stainless-steel disc 860*b* integrated at the bottom of the cell body oriented to utilise the screen-printed electrode chip 814*b* may each serve as a built-in counter electrode when an external counter electrode is desired for electrochemical measurements.

Figure 7:
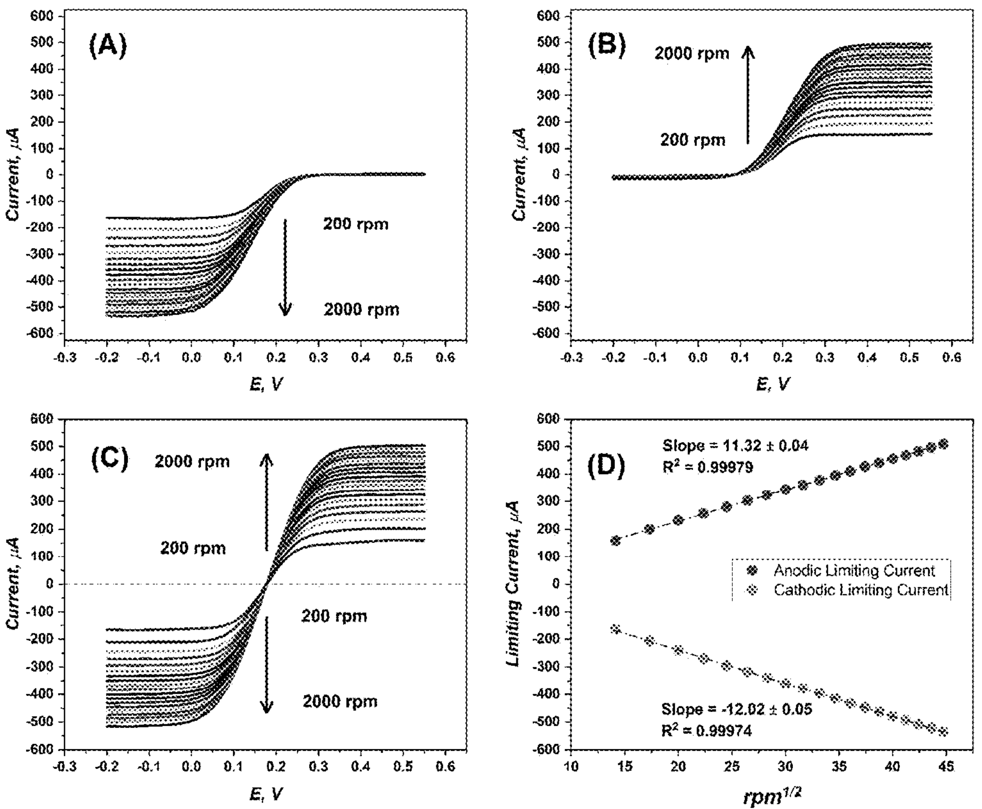
FIG. 7 illustrates linear sweep hydrodynamic voltammograms and the linear dependence of the limiting current on $RPM^{1/2}$ according to embodiments of the present disclosure.

Referring to FIG. 7, there is shown linear sweep hydrodynamic voltammograms of the 5.0 mM hexacyanoferrate (III) (A), 5.0 mM hexacyanoferrate(II) (B), and a mixture of 5.0 mM each (C) in 0.1 M $KNO_3$ recorded using the 250 AT-SPEC at different rpm values (from 200 to 2000, increments=100 rpm) at scan rate of 50 mV/s. Linear sweep voltammograms obtained for hexacyanoferrate(III), hexacyanoferrate(II) and a mixture of equimolar concentrations of both at different rpm values are presented in FIG. 7(A-C) and the linear correlations between the obtained anodic and cathodic limiting currents and rpm½ are shown in FIG. 7(D).

Figure 8:
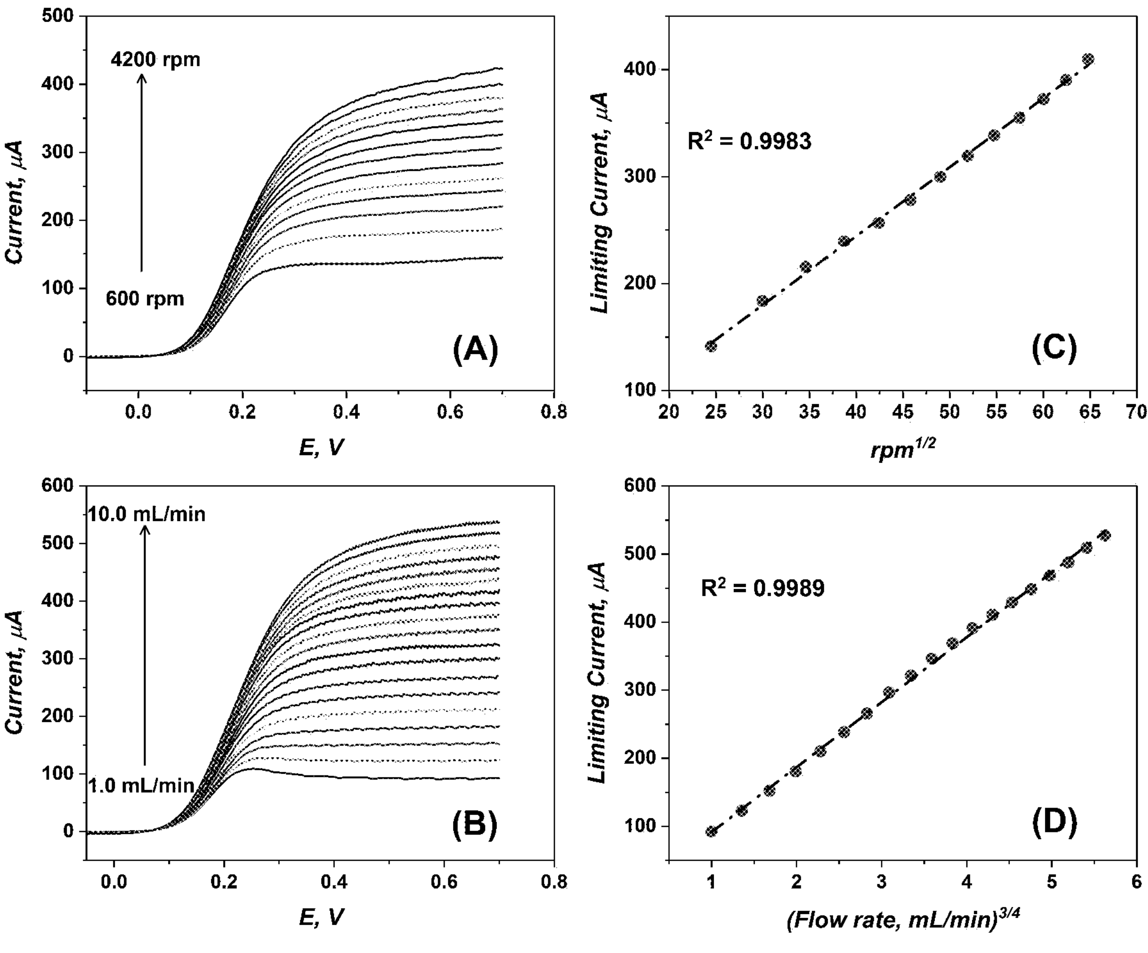
FIG. 8 depicts graphs illustrating linear sweep voltammograms for rotational hydrodynamic and wall-jet flow, respectively, according to embodiments of the present disclosure.

Referring to FIG. 8, there is illustrated linear sweep voltammograms of 5.0 mM hexacyanoferrate(II) in 0.1M $KNO_3$ at SWCNT-SPEC (Model 110) under the rotation mode (A) and wall-jet mode (B). The corresponding linear correlation between the obtained steady state limiting currents and $rpm^{1/2}$ and volumetric flow $rate^{3/4}$ are presented in (C) and (D), respectively.

Graph A of FIG. 8 shows current in microamperes plotted against potential in volts. Graph A displays multiple linear sweep voltammograms recorded at different rotation speeds ranging from 600 rpm to 4200 rpm. The voltammograms in Graph A demonstrate that current increases with increasing rotation speed of the rotating rod. The electrochemical cell configuration corresponding to the electrochemical cell 100 and the electrochemical cell 300 may produce limiting currents that are equivalent to predictions of the Levich equation for quantitative calculations of parameters including number of electrons, electrochemical area of the electrode, and diffusion coefficient.

With continued reference to FIG. 8, Graph B shows limiting in microamperes plotted against potential in volts. Graph B displays multiple linear sweep voltammograms recorded at different flow rates ranging from 1.0 mL/min to 10.0 mL/min. The voltammograms in Graph B demonstrate that current increases with increasing flow rate of the carrier solution. The electrochemical cell configuration corresponding to the electrochemical cell 400 may operate in a wall-jet hydrodynamic flow mode when carrier solution flows through the longitudinal axis of the rotating rod.

As further shown in FIG. 8, Graph C demonstrates a linear correlation between limiting current in microamperes and the square root of rpm. Graph C includes data points and a linear regression line with a coefficient of determination ($R^2$) of 0.9983. The linear correlation between limiting current and $rpm^{1/2}$ confirms agreement with theoretical predictions for rotational hydrodynamic flow. The electrochemical cell configuration corresponding to the electrochemical cell 400 may operate in a rotational hydrodynamic flow mode similar to the electrochemical cell 300. In the rotating rod mode, limiting currents produced by the electrochemical cell may be proportional to rpm to the power of ½.

With continued reference to FIG. 8, Graph D demonstrates a linear correlation between limiting current in microamperes and the volumetric flow rate raised to the three-quarters power in units of $(mL/min)^{3/4}$. Graph D includes data points and a linear regression line with a coefficient of determination ($R^2$) of 0.9989. The linear correlation between limiting current and volumetric flow $rate^{3/4}$ confirms agreement with theoretical predictions for wall-jet hydrodynamic flow configurations. In the wall-jet mode, limiting currents produced by the electrochemical cell may be proportional to volumetric flow rate to the power of ¾.

The electrochemical cell configuration corresponding to the electrochemical cell 400 may operate in four hydrodynamic modes. In a first mode, the electrochemical cell may operate in rotational hydrodynamic flow similar to the electrochemical cell 300. In a second mode, the electrochemical cell may operate in wall-jet hydrodynamic flow. In a third mode, the electrochemical cell may operate as a wall-jet flow injection analysis detector in absence of rod rotation. In a fourth mode, the electrochemical cell may operate as a wall-jet flow injection analysis detector with additional hydrodynamic rotation provided by the rotating rod. The fourth mode may combine rotational hydrodynamic flow induced by the rotating rod with wall-jet hydrodynamic flow at the electrode surface.

Figure 9:
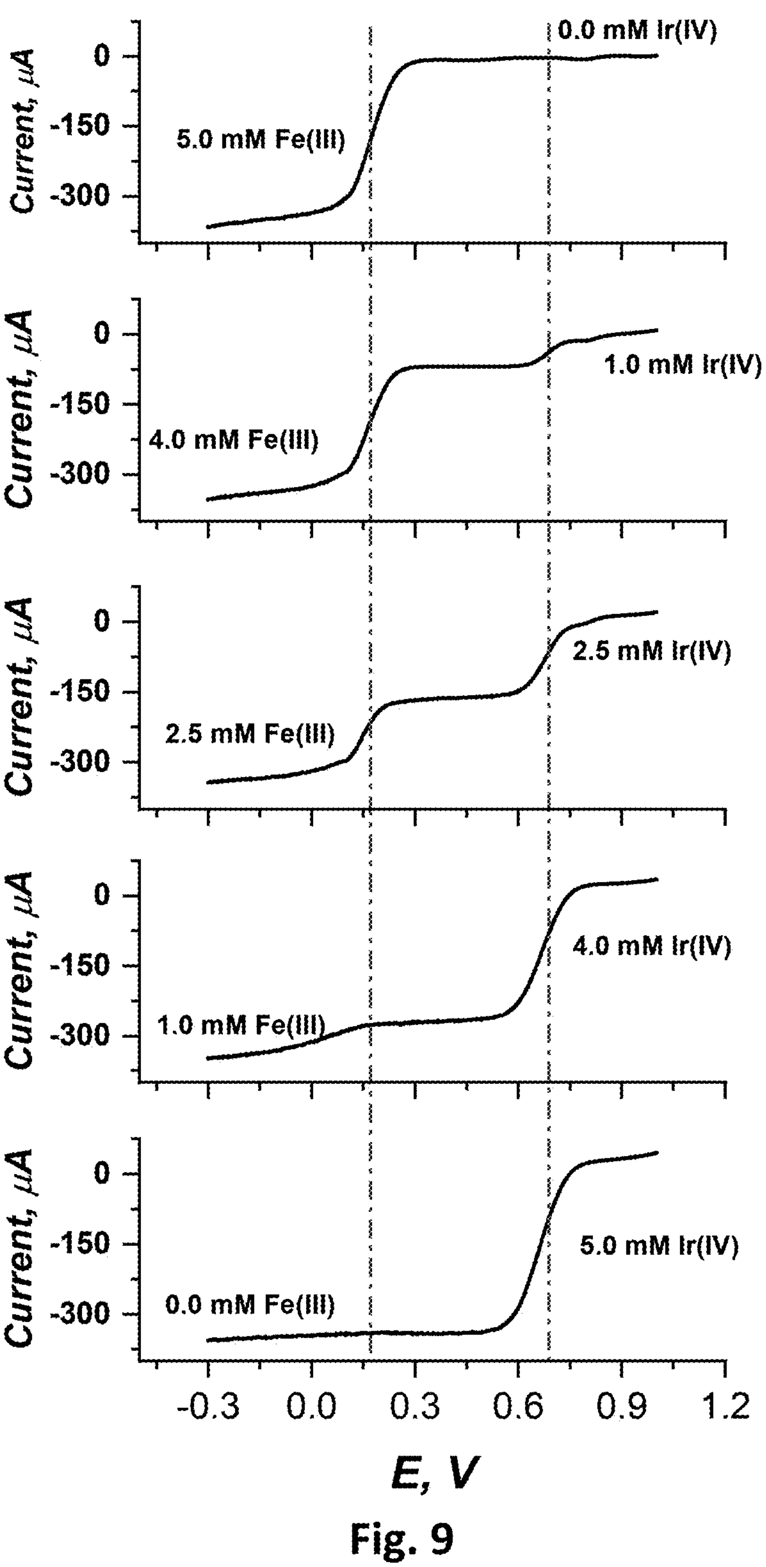
FIG. 9 depicts hydrodynamic linear sweep voltammograms for multi-analyte analysis, according to embodiments of the present disclosure.

Referring to FIG. 9, a series of five hydrodynamic linear sweep voltammograms is shown illustrating electrochemical response of mixtures containing hexachloroiridate(IV) and hexacyanoferrate(III) at varying concentrations. Each voltammogram displays current in microamperes on a vertical axis versus potential in volts on a horizontal axis, with the potential ranging from approximately 1.2 volts to −0.3 volts. Two vertical dashed lines are present in each voltammogram, indicating half-wave potentials of the two redox systems at approximately 0.17 volts and 0.68 volts, respectively. These voltammograms obtained with cell 300.

With continued reference to FIG. 9, a top voltammogram shows the response for a solution containing 5.0 millimolar hexacyanoferrate(III) and 0.0 millimolar hexachloroiridate (IV), displaying a single reduction wave near 0.17 volts. A second voltammogram from the top corresponds to 4.0 millimolar hexacyanoferrate(III) and 1.0 millimolar hexachloroiridate(IV), showing two distinct reduction waves. A middle voltammogram represents equimolar concentrations of 2.5 millimolar for both species, with comparable wave heights at both potentials. A fourth voltammogram shows 1.0 millimolar hexacyanoferrate(III) and 4.0 millimolar hexachloroiridate(IV), where the wave at 0.68 volts is more prominent. A bottom voltammogram displays the response for 0.0 millimolar hexacyanoferrate(III) and 5.0 millimolar hexachloroiridate(IV), showing a single reduction wave near 0.68 volts.

As further shown in FIG. 9, the limiting currents in each voltammogram are proportional to the respective concentrations of each species. The two distinct reduction waves at the half-wave potentials of approximately 0.17 volts for hexacyanoferrate(III) and approximately 0.68 volts for hexachloroiridate(IV) enable resolution and quantification of multiple electroactive species in a single measurement. The electrochemical cell may be applicable to electrochemical techniques including linear sweep voltammetry. The electrochemical cell may also be applicable to electrochemical techniques including hydrodynamic voltammetry. The separation between the two half-wave potentials allows independent determination of each species concentration from the corresponding limiting current of each wave. The electrochemical cell configuration may enable multi-analyte analysis where two or more electroactive species with different half-wave potentials are present in a sample solution.

Figure 10:
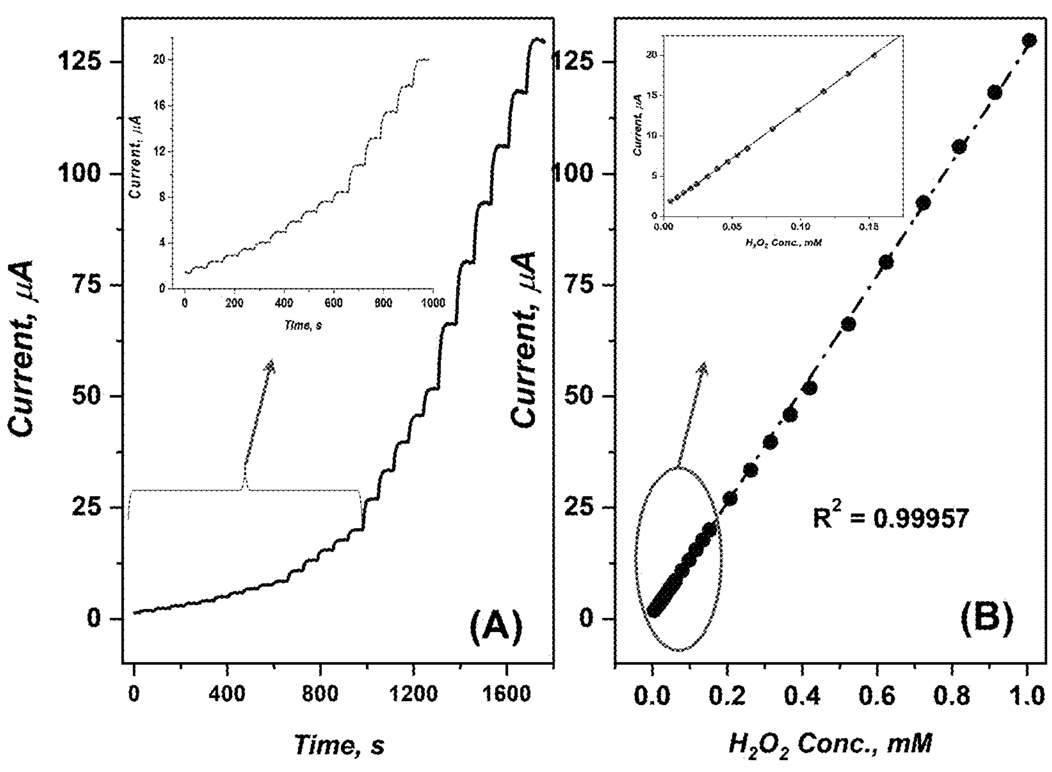
FIG. 10 depicts an amperometric response trace and a calibration plot, according to embodiments of the present disclosure.

Referring to FIG. 10, electrochemical characterization data illustrating amperometric response and calibration is shown. FIG. 10 includes two panels labeled A and B.

Panel A of FIG. 10 shows an amperometric response trace plotting current in microamperes on a vertical axis against time in seconds on a horizontal axis. The trace displays a stepwise increase in current over time corresponding to consecutive additions of hydrogen peroxide. The amperometric response was recorded at a platinum screen-printed electrode chip polarized at 0.7 V in phosphate buffer at pH 7 with a rotation speed of 1000 rpm. An inset graph in Panel A shows a magnified view of a lower current region corresponding to stepwise responses in a concentration range between 5 and 150 micromolar. The graph shows increasing current response with increasing hydrogen peroxide concentration.

With continued reference to FIG. 10, Panel B shows a calibration plot of current in microamperes versus hydrogen peroxide concentration in millimolar units. The data points in Panel B follow a linear relationship with a coefficient of determination ($R^2$) of 0.99957. An inset graph in Panel B provides a magnified view of a lower concentration region, demonstrating linearity at concentrations less than 150 micromolar. The electrochemical cell may be applicable to electrochemical techniques including amperometry. The amperometric response demonstrates stable current measurements with stepwise increases corresponding to each addition of hydrogen peroxide to the sample solution.

The working electrode may be either the screen-printed electrode or any of the solid electrodes (see FIG. 3). In case of employing the screen-printed working electrode, the counter and/or the reference electrodes could be either of those screen-printed electrodes available on the same SPEC or the built-in counter electrode in the cell body and the external reference. Therefore, SPECs' utilization opens the possibility of using screen printed working and counter electrodes as WE1 and WE2, respectively while connecting the built-in counter electrode. The applicability of such dual working electrode configuration is demonstrated by simultaneous anodic and cathodic amperometric response to hexacyanoferrate(II) and hexacyanoferrate(III) mixtures as shown in FIG. 11.

Figure 11:
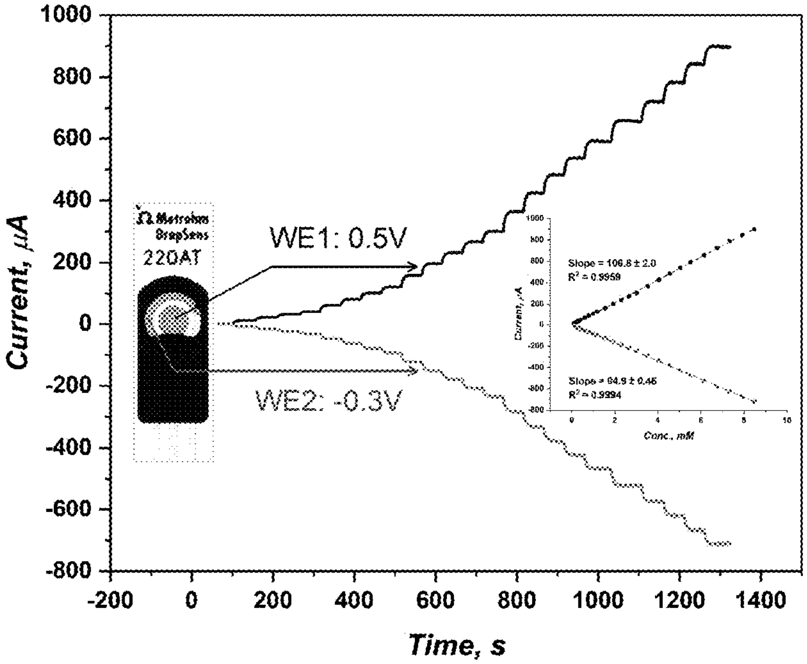
FIG. 11 depicts a dual amperometric response trace with simultaneous measurements, according to embodiments of the present disclosure.

Referring to FIG. 11, a dual amperometric response trace showing simultaneous measurements from two working electrodes is depicted. FIG. 11 shows simultaneous anodic and cathodic amperometric response to hexacyanoferrate(II) and hexacyanoferrate(III), at screen printed gold electrode (WE1) and screen-printed gold electrode (WE2), respectively in 0.1M $KNO_3$. A vertical axis represents current in microamperes ranging from negative 800 to positive 1000, while a horizontal axis represents time in seconds. A first trace corresponds to a first working electrode operated at positive 0.5 volts, showing stepwise increases in positive current. A second trace corresponds to a second working electrode operated at negative 0.3 volts, showing stepwise decreases into negative current values.

With continued reference to FIG. 11, the dual amperometric response trace demonstrates simultaneous anodic and cathodic amperometric response to hexacyanoferrate(II) and hexacyanoferrate(III) mixtures. The first working electrode may be a screen-printed gold working electrode on a screen-printed electrode chip. The second working electrode may be a screen-printed gold counter electrode on the same screen-printed electrode chip operated as a second working electrode. An inset image shows a screen-printed electrode chip with dual working electrodes. An accompanying calibration plot displays linear relationships between current and concentration for both electrodes, with slope and coefficient of correlation values indicated for each electrode. The electrochemical cell may be applicable to electrochemical techniques including dual amperometry. The dual working electrode configuration enables simultaneous detection of oxidizable and reducible species in a single measurement by operating the first working electrode at an anodic potential and the second working electrode at a cathodic potential.

Figure 12:
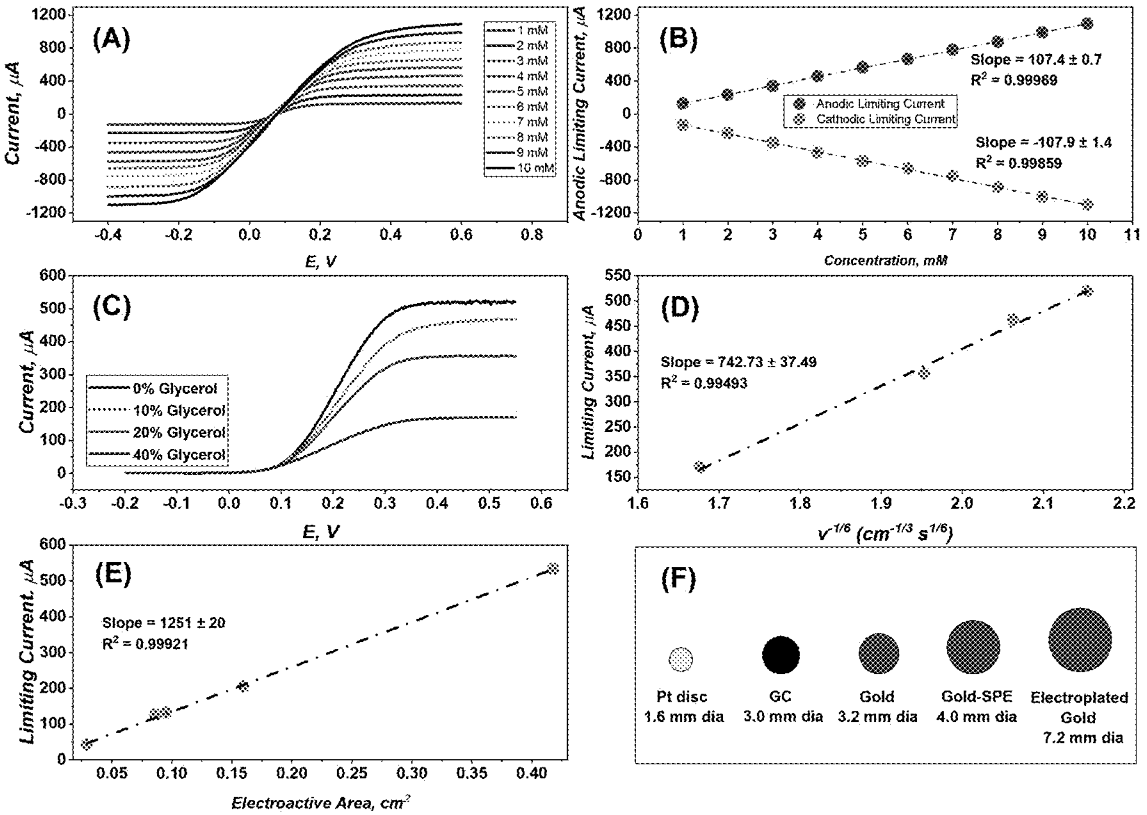
FIG. 12 depicts electrochemical characterization data verifying Levich equation agreement, according to embodiments of the present disclosure.

Referring to FIG. 12, electrochemical characterization data verifying agreement between limiting currents obtained with the electrochemical cell and predictions from the Levich equation is shown for concentration (A and B), kinematic viscosity (C and D), and electrode area (E and F). The Levich equation relates the diffusion-limiting current ($i_L$, A) to experimental parameters according to the relationship:

$$i_L = 0.62 nFAC^{\circ} D^{2/3} v^{-1/6} \overline{\omega}^{1/2}$$

where n is the number of electrons, F is the Faraday constant (Coul. $mol^{-1}$), A is the electrode area, C.° is the analyte bulk concentration (mol $m^{-3}$), D is the diffusion coefficient ($m^2 s^{-1}$), v is the kinematic viscosity ($m^2 s^{-1}$), and $\overline{\omega}$ is the angular velocity (rad $s^{-1}$). FIG. 12 includes six panels labelled A through F that demonstrate the correlation between limiting currents and each variable in the Levich equation.

Panel A of FIG. 12 shows linear sweep voltammograms of hexacyanoferrate at various concentrations ranging from 1 mM to 10 mM. Current is measured in microamperes on a vertical axis and potential is measured in volts on a horizontal axis. The voltammograms display both anodic and cathodic waves corresponding to oxidation of hexacyanoferrate(II) and reduction of hexacyanoferrate(III) species. The limiting currents increase with increasing concentration, demonstrating the linear dependence of limiting current on bulk concentration as predicted by the Levich equation.

With continued reference to FIG. 12, Panel B presents calibration plots showing the linear relationship between anodic limiting current and cathodic limiting current versus concentration in millimolar. The anodic limiting current exhibits a slope of 107.4±0.7 with a coefficient of determination ($R^2$) of 0.99969. The cathodic limiting current exhibits a slope of negative 107.9±1.4 with a coefficient of determination ($R^2$) of 0.99859. The linear correlations in Panel B confirm that limiting currents are directly proportional to bulk concentration (Co) as specified in the Levich equation.

As further shown in FIG. 12, Panel C displays linear sweep voltammograms of hexacyanoferrate(II) recorded in solutions containing different percentages of glycerol, specifically 0%, 10%, 20%, and 40% glycerol. The addition of glycerol to aqueous solutions increases the kinematic viscosity of the solution. The voltammograms in Panel C demonstrate that limiting currents decrease with increasing glycerol percentage, corresponding to the inverse relationship between limiting current and kinematic viscosity predicted by the Levich equation.

With continued reference to FIG. 12, Panel D shows the linear correlation between limiting current and the inverse sixth power of kinematic viscosity (v-⅙). Panel D includes data points and a linear regression line with a slope of 742.73±37.49 and a coefficient of determination ($R^2$) of 0.99493. The linear correlation in Panel D confirms that limiting currents are proportional to v-⅙ as specified in the Levich equation.

Panel E of FIG. 12 presents the linear relationship between limiting current and electroactive area measured in square centimeters. Panel E includes data points and a linear regression line with a slope of 1251±20 and a coefficient of correlation ($R^2$) of 0.99921. The linear correlation in Panel E confirms that limiting currents are directly proportional to electrode area (A) as specified in the Levich equation.

As further shown in FIG. 12, Panel F provides a visual representation of the different electrode types and sizes used in the electrode area verification experiments. Panel F shows a platinum disc electrode with a diameter of 1.6 mm, a glassy carbon electrode with a diameter of 3.0 mm, a gold electrode with a diameter of 3.2 mm, a gold screen-printed electrode with a diameter of 4.0 mm, and an electroplated gold electrode with a diameter of 7.2 mm. The range of electrode materials and sizes in Panel F demonstrates that the electrochemical cell may be compatible with various electrode configurations while maintaining agreement with Levich equation predictions.

The verification of each variable in the Levich equation as shown in FIG. 12 demonstrates that the electrochemical cell produces limiting currents that are quantitatively equivalent to predictions from the Levich equation. The electrochemical cell may be applicable to quantitative measurements of parameters appearing in the Levich equation, including the number of electrons (n), the electrochemical area of the electrode (A), and the diffusion coefficient (D). The electrochemical cell may be applicable to electrochemical techniques including cyclic voltammetry. The electrochemical cell may also be applicable to electrochemical techniques including chronocoulometry.

Figure 13:
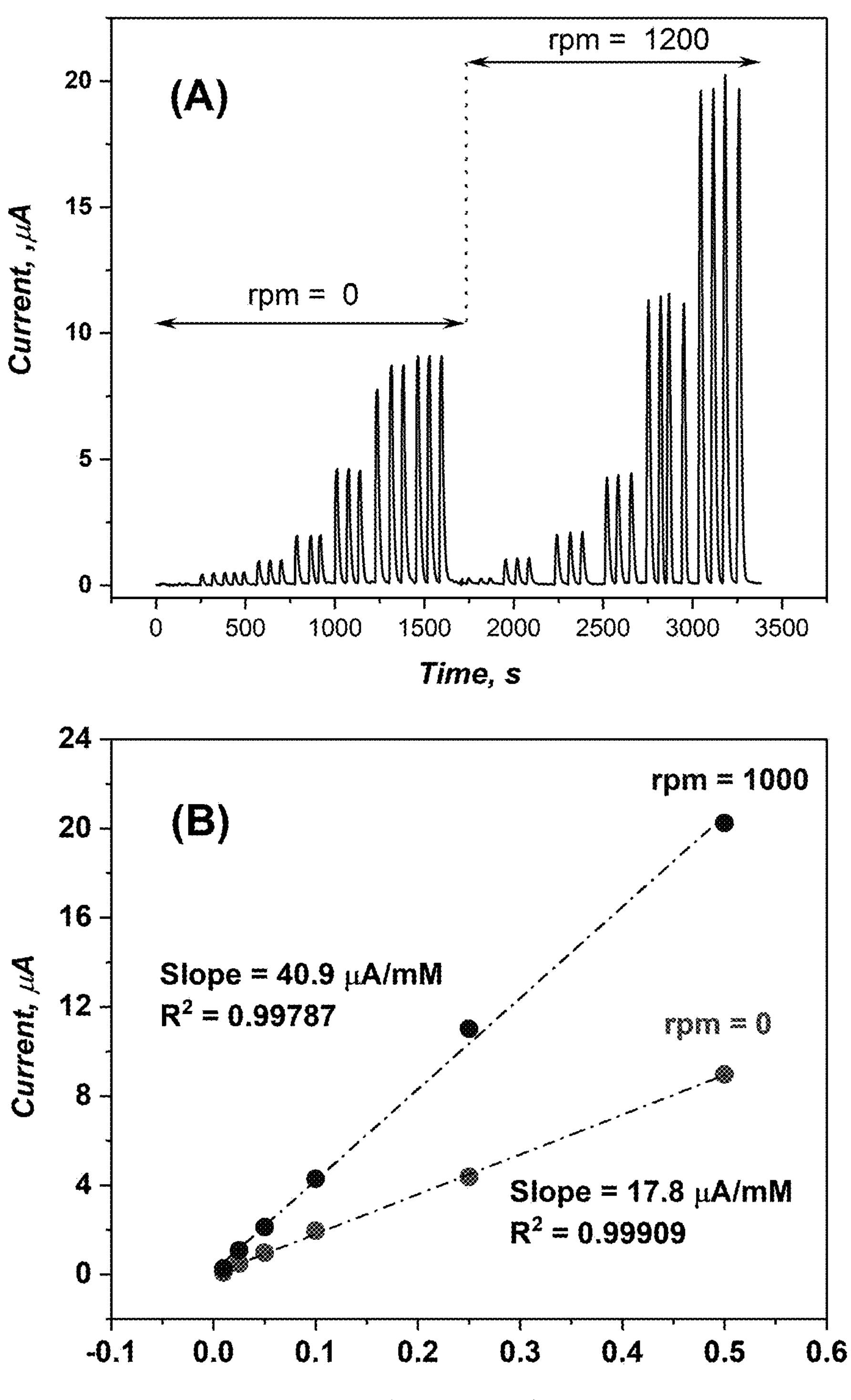
FIG. 13 depicts flow injection analysis response traces and calibration plots, according to embodiments of the present disclosure.

Referring to FIG. 13, flow injection analysis data illustrating the enhancement effect of rod rotation on electrochemical detection sensitivity is shown. FIG. 13 includes two graphs labelled A and B that demonstrate the flow injection analysis response and corresponding calibration data for hexacyanoferrate(II) sample injections under different rotation conditions.

Graph A of FIG. 13 shows current in microamperes plotted against time in seconds. Graph A displays a series of anodic flow injection analysis peaks corresponding to hexacyanoferrate(II) sample injections in a concentration range of 10 to 500 micromolar. The carrier solution was 0.1 M $KNO_3$ at a flow rate of 1.5 mL/min, and a single wall carbon nanotube screen-printed electrode chip was polarized at 0.3 V. The trace in Graph A shows two distinct regions corresponding to different rotation conditions of the rotating rod.

With continued reference to FIG. 13, a first region of Graph A corresponds to a rotation speed of zero revolutions per minute where the rotating rod remains stationary during sample injection and detection. A second region of Graph A corresponds to a rotation speed of 1200 revolutions per minute where the rotating rod rotates during sample injection and detection. The peaks in the second region exhibit substantially higher current responses compared to the peaks in the first region at corresponding concentrations. The difference in peak heights between the two regions demonstrates the enhancement effect of rod rotation on the flow injection analysis signal.

As further shown in FIG. 13, Graph B presents calibration plots showing current in microamperes versus hexacyanoferrate(II) concentration in millimolar for both rotation conditions. A first calibration line in Graph B corresponds to a rotation speed of 1000 revolutions per minute and exhibits a slope of 40.9 microamperes per millimolar with a coefficient of determination ($R^2$) of 0.99787. A second calibration line in Graph B corresponds to a rotation speed of zero revolutions per minute and exhibits a slope of 17.8 microamperes per millimolar with a coefficient of determination ($R^2$) of 0.99909. Both calibration lines demonstrate linear relationships between peak current and hexacyanoferrate(II) concentration.

With continued reference to FIG. 13, the ratio of the slopes between the rotating rod condition and the stationary rod condition indicates that rod rotation provides approximately 2.3 times greater sensitivity compared to stationary rod conditions. The rod rotation in the electrochemical cell configuration corresponding to the electrochemical cell 200 and the electrochemical cell 400 may enhance sensitivity by 130% compared to stationary rod operation in flow injection analysis mode. The enhancement in sensitivity results from the combination of wall-jet hydrodynamic flow from the carrier solution and rotational hydrodynamic flow induced by the rotating rod at the electrode surface.

The electrochemical cell configuration corresponding to the electrochemical cell 100 and the electrochemical cell 300 may provide a limit of detection of 0.3 micromolar for hexacyanoferrate(III). The electrochemical cell configuration corresponding to the electrochemical cell 200 and the electrochemical cell 400 may provide a lower limit of detection of 0.25 micromolar for hexacyanoferrate(III). The lower limit of detection values correspond to a signal-to-noise ratio of 3. The electrochemical cell configuration corresponding to the electrochemical cell 200 and the electrochemical cell 400 may provide improved detection sensitivity compared to the electrochemical cell configuration corresponding to the electrochemical cell 100 and the electrochemical cell 300 under identical measurement conditions.

Figure 14:
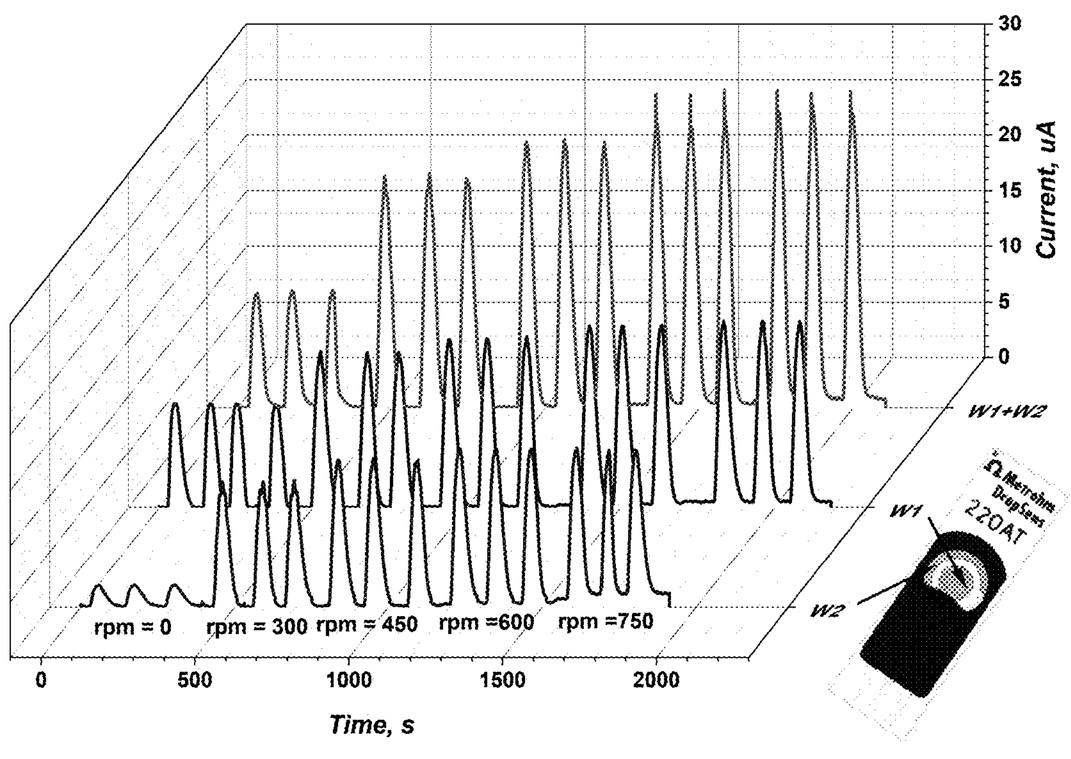
FIG. 14 depicts flow injection analysis response traces showing the effect of PEEK rod rotation on the flow injection analysis (FIA) individual response of W1 and W2 and the total response (W1+W2) electrodes of a gold SPEC.

Referring to FIG. 14, electrochemical data illustrating the effect of rotating rod rotation on flow injection analysis response of dual working electrodes is shown. FIG. 14 presents flow injection analysis traces recorded using a gold screen-printed electrode chip (model 220AT) with 0.1 M $KNO_3$ carrier solution, 500 μL sample injections, and a carrier flow rate of 0.75 mL/min. The gold screen-printed electrode chip provides both a gold working electrode and a gold counter electrode that may be operated as a first working electrode (WE1) and a second working electrode (WE2), respectively.

With continued reference to FIG. 14, the flow injection analysis response was recorded at rotation speeds of 0, 300, 450, 600, and 750 rpm in separate experiments for WE1, WE2, and WE1 and WE2 connected as a single working electrode. The first working electrode (WE1) is centered and faces the jet flow from the carrier solution outlet. The second working electrode (WE2) has a different geometry and relative arrangement compared to WE1. The peak currents for both WE1 and WE2 increase with increasing rotation speed of the rotating rod.

As further shown in FIG. 14, WE1 provides higher currents than WE2 for all tested rotation speed values. The ratio between WE1 current and WE2 current varies from 4.7 times at a rotation speed of 0 rpm to 1.2 times at a rotation speed of 750 rpm. The percent enhancement of WE2 peak current with increasing rotation speed is higher than the percent enhancement of WE1 peak current. WE1 benefits more from the wall-jet flow configuration while WE2 benefits more from the hydrodynamic rotation flow induced by the rotating rod. Under all tested conditions, the WE1 current remains higher than the WE2 current.

Figure 15:
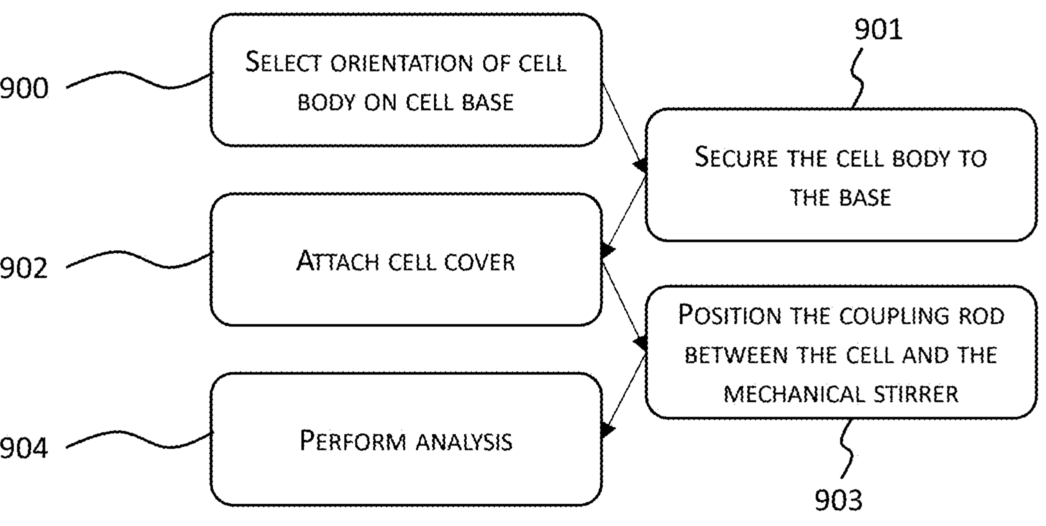
FIG. 15 illustrates a flowchart of a method for configuring an electrochemical cell, according to embodiments of the present disclosure.

Referring to FIG. 15, a method for configuring an electrochemical cell according to an embodiment of the present disclosure is shown in flowchart form. The method includes a step 900 for selecting an orientation of a cell body on a cell base. Following the step 900, the method proceeds to a step 901 for securing the cell body to the base 901. Following the step 901, the method proceeds to a step 902 for attaching a cell cover. After the step 902, the method continues to a step 903 for positioning the coupling rod between the cell and the mechanical stirrer 903. After the step 903, the method continues to a step 904 for performing analysis 904.

With continued reference to FIG. 15, the step 900 involves selecting an orientation of the cell body on the cell base based on whether a user wishes to utilize a screen-printed electrode chip or a solid disc electrode for electrochemical measurements. The cell base may accommodate both screen-printed electrode chips and solid disc electrodes as described in connection with FIG. 3 and FIG. 6. The cell body may be oriented in a first orientation to align a neck opening with the screen-printed electrode chip positioned on the cell base. The cell body may alternatively be oriented in a second orientation to align the neck opening with the solid disc electrode positioned on the cell base. The selection of orientation in the step 900 may be based on application requirements including electrode material, electrode size, and measurement technique.

To secure the cell body to the base 901, metallic bolts may be used to secure the body to the base. The cell body may comprise a flange, the flange may comprise a plurality of bolt holes for receiving the bolts to secure the cell body to the base. The base comprises a plurality of bolt holes arranged such that the bolt holes of the cell body will align with corresponding bolt holes of the base in either orientation of the cell body. For example, if the cell body comprises 4 bolt holes, the base may comprise 6 or 8 bolt holes such that the respective bolt holes will always be aligned regardless of the orientation of the cell body. The metallic bolts may be screwed through the threaded bolt holes of both the cell body and the cell base to secure the cell body and the cell base together.

As further shown in FIG. 15, the step 902 involves attaching the cell cover to the cell body after cell body has been secured to the cell base in the step 901. The cell cover may be secured in position by magnets as described in connection with FIG. 2A and FIG. 2B. The cell cover may include the polyetheretherketone (PEEK) rod configured to rotate and induce hydrodynamic flow at an electrode surface. The cell cover may be coupled to the independent overhead mechanical stirrer via the coupling rod. In some cases, the cell cover may include the rotation transfer belt and pulley system for dual batch/flow cell operation as described in connection with the electrochemical cell 200 and the electrochemical cell 400.

After attaching the cell cover 902, the coupling rod is positioned between the cell and the mechanical stirrer 903. The coupling rod may be detachable from the cell. The coupling rod may either engage with the rotating rod directly or may engage with a driving pulley as shown in FIG. 2B. The mechanical stirrer is engaged with an upper end of the coupling rod to convey rotational force through the coupling rod.

With continued reference to FIG. 15, the step 904 involves performing analysis using the configured electrochemical cell. The analysis in the step 904 may include stirred solution techniques such as linear sweep voltammetry, amperometry, or dual amperometry. The analysis in the step 904 may include non-stirred solution techniques such as cyclic voltammetry or chronocoulometry. In some cases, the analysis in the step 904 may include flow injection analysis when the electrochemical cell is configured with the PEEK tube for carrier solution delivery through the longitudinal axis of the rotating rod. The analysis in the step 904 may be performed in aqueous media or non-aqueous media. The analysis in the step 904 may be performed at controlled temperature or ambient temperature. The analysis in the step 904 may be performed at controlled atmosphere or ambient atmosphere.

The method shown in FIG. 15 enables users to configure the electrochemical cell for either screen-printed electrode chips or solid disc electrodes based on application requirements. The dual-electrode configuration of the cell base allows the electrochemical cell to be assembled in two different orientations without requiring separate cell bases for different electrode types. The method provides flexibility for users to select electrode configurations based on factors including electrode material compatibility, electrode surface area, and measurement sensitivity requirements.

Figure 16A:
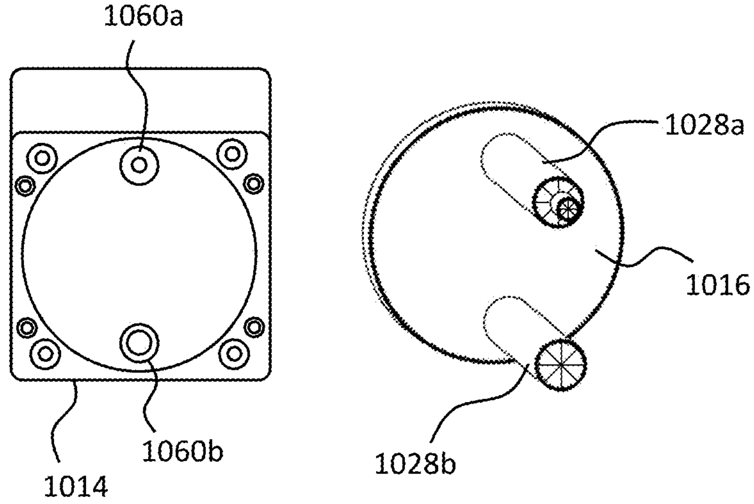
FIG. 16A and FIG. 16B show a dual neck and dual rod arrangement according to an embodiment of the present disclosure.

Referring to FIG. 16A, a top-down view of the cell body 1014 and a bottom view of the cell cover 1016 is shown according to an embodiment of the present disclosure.

The figure depicts a dual neck and dual rod arrangement that can be coupled for rotation either individually or simultaneously. The body 1014 is provided with a large neck **1060*b* for larger electrode configurations such as rotating ring disc electrode (RRDE) configurations. The RRDE may be positioned underneath the large neck A rotating ring disc electrode comprises a pair of concentric electrodes: an inner circular disc shaped disc electrode, and a ring electrode concentrically arranged around the circumference of the disc electrode, separated by a gap that may comprise an insulator, the insulator may be either epoxy and/or may comprise the substrate material such as PEEK. The body 1014 is also provided with a regular neck 1060*a* for SPECs and single solid electrode configurations. The cell body 1014** is fabricated from a PEEK sheet (12 mm thick) and a hollow PEEK cylinder (65 mm ID×86 mm OD).

The large neck may have a diameter of about 15 mm, while the small neck may have a diameter of about half that of the large neck, such as a diameter of around 8 mm.

The cell cover 1016 comprises a large PEEK rod **1028*b* for use with corresponding large neck 1060*b* and a PEEK rod with a narrower end section 1028*b* for use with corresponding regular neck 1060*a*. In embodiments, the cell cover 1016** comprises small PEEK rods for engaging with cavities drilled into the upper surface of the cell body, to prevent rotation drag of the cell cover when inserted. In embodiments, the cell cover and the cell body comprise corresponding magnets for removably securing the cell cover to the cell body without requiring bolts or mechanical fasteners, which may decrease the time required to assemble the electrochemical cell assembly.

Figure 16B:
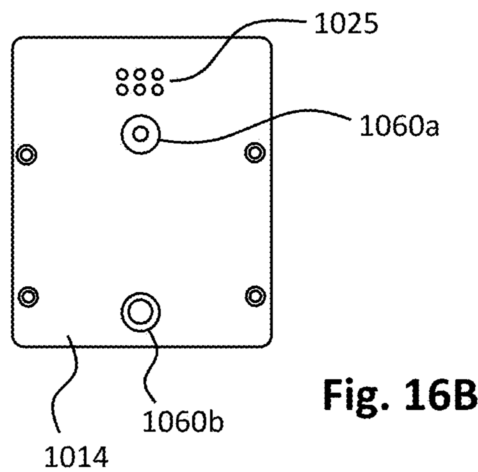

Referring to FIG. 16B, a bottom view of the assembled electrochemical cell body and cover is shown according to an embodiment of the present disclosure.

In furtherance to the details described in relation to FIG. 16A, there are shown 6-spring loaded connectors 1025 for engagement with SPEC's electrical connections.

Each of the large neck **1060*b* and the regular neck 1060*a* comprise O-ring cavities as previously shown in FIGS. 2A and 2**B for example.

The electrochemical cell integrates multiple components that cooperate to provide controlled hydrodynamic flow at an electrode surface during electrochemical measurements. The cell base provides a platform that accommodates both screen-printed electrode chips and solid disc electrodes, with the electrode positioned to face upward toward the sample chamber. The cell body is disposed above the cell base and defines a sample chamber that contains the sample solution. The cell body includes a stainless-steel disc integrated at a bottom portion that forms a neck region with controlled dimensions. The neck region establishes a defined geometry between the rotating rod and the electrode surface. The cell cover is positioned above the cell body and supports the rotating rod through bearings that maintain a stable vertical rotation axis. The coupling rod extends from the cell cover and connects to the independent overhead mechanical stirrer, which provides rotational motion with integrated speed control.

The rotating PEEK rod extends from the cell cover through the neck region and into proximity with the electrode surface. The independent overhead mechanical stirrer imparts rotational motion to the rotating PEEK rod via the coupling rod. The rotation of the PEEK rod induces convective flow in the sample solution within the neck region and at the electrode surface. The bearings fitted within the cell cover support the rotating PEEK rod and maintain alignment of the rotation axis perpendicular to the electrode surface. The stable rotation axis and controlled geometry of the neck region establish laminar hydrodynamic flow conditions at the electrode surface.

The electrochemical cell configuration that employs the slotted rod geometry achieves equivalence to the rotating disc electrode through optimization of the rod bottom geometry and neck dimensions. The slotted segmented rod bottom includes eight machined channels that extend radially from a center of the rod toward an outer edge. The channels enhance the stirring effect of the rotating rod and establish hydrodynamic flow patterns at the electrode surface that correspond to the flow patterns produced by a rotating disc electrode. The neck height and neck diameter are optimized to provide efficient hydrodynamic flow while maintaining the electrode surface within the laminar flow region. The combination of the slotted rod geometry with the optimized neck height of 3.0 mm and neck diameter of 7.25 mm produces limiting currents that are quantitatively equivalent to predictions from the Levich equation. The equivalence to the rotating disc electrode enables quantitative determination of parameters including diffusion coefficients, electrode areas, and electron transfer numbers from electrochemical measurements.

The electrochemical cell configuration that provides dual batch/flow cell functionality employs a pulley-belt rotation mechanism and a coaxial carrier solution inlet. The driving pulley is connected to the coupling rod and receives rotational motion from the independent overhead mechanical stirrer. The rotation transfer belt couples the driving pulley to the secondary pulley, which is attached to the rotating PEEK rod. The pulley-belt mechanism transfers rotational motion to the rotating PEEK rod while freeing the headspace above the rod for carrier solution delivery. The PEEK tube extends coaxially through the rotating rod assembly and delivers carrier solution through the longitudinal axis of the rotating PEEK rod. The stainless-steel tube inserted within the rotating PEEK rod interfaces with the PEEK tube and provides a pathway for carrier solution flow to the electrode surface. The Teflon ferrule provides a seal between the non-rotating PEEK tube and the rotating rod components, enabling continuous carrier solution flow during rod rotation.

The dual batch/flow cell configuration may operate in multiple hydrodynamic modes. In a batch mode, the rotating PEEK rod induces rotational hydrodynamic flow at the electrode surface similar to the electrochemical cell configuration with the slotted rod geometry. In a wall-jet mode, carrier solution flows through the coaxial inlet and impinges on the electrode surface, establishing wall-jet hydrodynamic flow. In a flow injection analysis mode, samples are injected upstream through an injection valve and transported to the electrode surface by the carrier solution flow. The flow injection analysis mode may operate with the rotating rod stationary or with the rotating rod rotating to combine wall-jet flow with rotational hydrodynamic flow. The combination of wall-jet flow and rotational hydrodynamic flow may enhance detection sensitivity compared to wall-jet flow alone.

The selection of driving pulley and secondary pulley diameters may adjust the rpm ratio between the independent overhead mechanical stirrer and the rotating PEEK rod. A 1:1 rpm ratio may be achieved using pulleys of equal diameter. A 1:3 rpm ratio may be achieved using a driving pulley with a larger diameter than the secondary pulley. The ability to increase the rpm ratio enables the rotating PEEK rod to achieve rotation speeds that exceed the maximum rpm limit of the independent overhead mechanical stirrer.

The electrochemical cell provides compatibility with both screen-printed electrode chips and solid disc electrodes through the dual-electrode configuration of the cell base. The cell body may be oriented in two positions relative to the cell base to align the neck opening with either the screen-printed electrode chip or the solid disc electrode. The stainless-steel disc integrated at the bottom of the cell body may serve as a built-in counter electrode when external counter electrode operation is desired. The electrical contact adaptor provides connections to the electrodes on the screen-printed electrode chip, and the connector pins establish electrical communication with external instrumentation.

The electrochemical cell provides compatibility with both aqueous and non-aqueous media through the use of PEEK material for the cell base, cell body, cell cover, and rotating rod. PEEK material provides chemical resistance to organic solvents including acetonitrile while maintaining mechanical stability during rotation. The O-ring positioned within the neck region provides sealing between the cell body and the cell base, and the O-ring material may be selected for compatibility with the sample medium.

The electrochemical cell provides controlled temperature operation through the double-jacket compartment integrated at the bottom of the cell body. The double-jacket compartment includes inlet and outlet ports for circulating thermostated water from a water circulating bath. The stainless-steel cylinder protruding into the sample chamber provides efficient heat exchange between the circulated thermostated water and the sample solution. The controlled temperature operation enables measurements at temperatures other than ambient temperature, which may be relevant for kinetic studies and for samples that require specific temperature conditions.

The electrochemical cell provides controlled atmosphere operation through gas inlet and outlet ports incorporated in the cell cover. The gas ports enable purging of the sample chamber with inert gas or other controlled gas environments. The multipurpose opening in the cell cover may be used for sample injections, inserting a thermometer for temperature monitoring, or inserting an external reference electrode. When not in use, the multipurpose opening may be closed with appropriate stoppers to maintain the controlled atmosphere.

The electrochemical cell provides enhanced sensitivity through hydrodynamic rotation at the electrode surface. The steady-state mass transport conditions established by the rotating rod result in reduced capacitive currents and improved signal-to-noise ratios compared to quiescent solution techniques. The laminar flow conditions at the electrode surface provide reproducible limiting currents that are proportional to analyte concentration. The dual batch/flow cell configuration may provide additional sensitivity enhancement by combining rotational hydrodynamic flow with wall-jet flow during flow injection analysis operation.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the present disclosure, defined in scope by the following claims.

Many changes, modifications, variations and other uses and applications of the present disclosure will become apparent to those skilled in the art after considering this specification and the accompanying drawings, which disclose the preferred embodiments thereof. All such changes, modifications, variations and other uses and applications, which do not depart from the spirit and scope of the present disclosure, are deemed to be covered by the invention, which is to be limited only by the claims which follow.

The invention claimed is:

1. An electrochemical cell for electrochemical analysis, comprising:

a cell base comprising a screen-printed electrode chip and a solid disc electrode;

a cell body defining a sample chamber, wherein the cell body is attachable to the cell base in a first orientation to align a neck region with the screen-printed electrode chip and in a second orientation to align the neck region with the solid disc electrode;

a cell cover detachably connected to the cell body; and a rotating rod extending through the cell cover into the sample chamber.

2. The electrochemical cell of claim 1, wherein the cell cover is magnetically connected to the cell body.

3. The electrochemical cell of claim 1, wherein the rotating rod is a polyetheretherketone (PEEK) rod.

4. The electrochemical cell of claim 3, wherein the polyetheretherketone (PEEK) rod comprises a slotted, segmented, distal end, wherein the slots extend radially from a central axis of the polyetheretherketone (PEEK) rod.

5. The electrochemical cell of claim 4, wherein the slotted, segmented, distal end comprises eight slots, and wherein the electrochemical cell is configured to generate limiting currents during hydrodynamic voltammetry.

6. The electrochemical cell of claim 1, wherein the cell body comprises an electrically conductive disc integrated at a bottom portion thereof, wherein the electrically conductive disc defines the neck region, and wherein the electrically conductive disc is configured to function as a counter electrode.

7. The electrochemical cell of claim 1, wherein the electrochemical cell comprises a coupling rod configured to drive rotation of the rotating rod.

8. The electrochemical cell of claim 1, comprising a tube disposed coaxially within the rotating rod, wherein the tube is configured to deliver a carrier solution through a longitudinal channel of the rotating rod.

9. The electrochemical cell of claim 8, comprising:

a driving pulley configured to connect to an overhead mechanical stirrer;

a secondary pulley attached to the rotating rod;

and a rotational coupling connecting the driving pulley to the secondary pulley such that rotation of the driving pulley causes the secondary pulley to rotate, wherein the electrochemical cell is configured to provide hydrodynamic flow at a selected electrode surface during sample injections through the longitudinal channel.

10. The electrochemical cell of claim 9, comprising spacers disposed between the cell body and the cell cover for adjusting a clearance between a distal end of the rotating rod and the selected electrode surface.

11. The electrochemical cell of claim 1, wherein the neck region is a first neck region and the rotating rod is a first rod configured to rotate, wherein the electrochemical cell comprises:

a second neck region; and a second rod extending through the cell cover into the sample chamber.

12. A method for configuring an electrochemical cell, comprising:

selecting an orientation of a cell body on a cell base, wherein the cell base comprises a screen-printed electrode chip and a solid disc electrode, and wherein the orientation determines whether a neck region of the cell body aligns with the screen-printed electrode chip or the solid disc electrode;

attaching a detachable cell cover to the cell body, wherein the cell cover supports a rotating rod configured to induce hydrodynamic flow at a surface of a selected electrode; and performing electrochemical analysis using the selected electrode.

13. The method of claim 12, wherein selecting the orientation comprises attaching the cell body to the cell base using a subset of bolt holes arranged around a perimeter of the cell base.

14. The method of claim 12, comprising connecting a coupling rod extending from the cell cover to an overhead mechanical stirrer.

15. The method of claim 12, wherein performing electrochemical analysis comprises performing hydrodynamic voltammetry with the rotating rod rotating to induce laminar flow at the surface of the selected electrode.

16. The method of claim 12, wherein performing electrochemical analysis comprises performing flow injection analysis with a carrier solution flowing through a longitudinal channel of the rotating rod.

17. The method of claim 16, wherein performing electrochemical analysis further comprises simultaneously rotating the rotating rod and flowing the carrier solution through the longitudinal channel to combine rotational hydrodynamic flow and wall-jet flow at the electrode surface.

18. A flow injection analysis system, comprising:

an electrochemical cell comprising a cell base comprising a screen-printed electrode chip and a solid disc electrode, a cell body disposed on the cell base and defining a sample chamber, and a detachable cell cover disposed on the cell body;

a rotating rod extending through the cell cover into the sample chamber, the rotating rod comprising a longitudinal channel and a tube disposed coaxially therein for delivering a carrier solution;

means for transferring rotation from an overhead mechanical stirrer to the rotating rod while permitting the carrier solution to flow through the longitudinal channel.

19. The flow injection analysis system of claim 18, wherein the means for transferring rotation comprises a driving pulley, a secondary pulley attached to the rotating rod, and a rotation transfer coupling connecting the driving pulley to the secondary pulley.

20. The flow injection analysis system of claim 18, wherein the flow injection analysis system is configured to simultaneously operate in a batch mode with the rotating rod inducing rotational hydrodynamic flow, and in a flow mode with the carrier solution providing wall-jet hydrodynamic flow at an electrode surface.

21. The flow injection analysis system of claim 18, wherein the cell body is attachable to the cell base in a first orientation to align a neck region with the screen-printed electrode chip and in a second orientation to align the neck region with the solid disc electrode.

* * * * *